US012662269B1

(12) United States Patent
Taylor et al.

(10) Patent No.: US 12,662,269 B1
(45) Date of Patent: Jun. 23, 2026

(54) UNMANNED AERIAL VEHICLE

(71) Applicant: Taylor & Lego Holdings, LLC., Sarasota, FL (US)

(72) Inventors: Alan Taylor, Myakka City, FL (US); Jerry Jordan, Bradenton, FL (US)

(73) Assignee: Taylor & Lego Holdings, LLC, Sarasota, FL (US)

( * ) Notice: Subject to any disclaimer, the term of this patent is extended or adjusted under 35 U.S.C. 154(b) by 0 days.

(21) Appl. No.: 18/241,229

(22) Filed: Aug. 31, 2023

Related U.S. Application Data

(60) Provisional application No. 63/448,240, filed on Feb. 24, 2023, provisional application No. 63/402,589, filed on Aug. 31, 2022.

(51) Int. Cl.
B64U 30/291 (2023.01)
B64U 10/14 (2023.01)
B64U 70/00 (2023.01)

(52) U.S. Cl.
CPC ........... B64U 30/291 (2023.01); B64U 10/14 (2023.01); B64U 70/00 (2023.01)

(58) Field of Classification Search
CPC ............................... E05B 65/46; E05B 55/005
USPC ............................................................ 70/85
See application file for complete search history.

(56) References Cited

U.S. PATENT DOCUMENTS

| | | | | |
|---|---|---|---|---|
| 1,043,739 | A | * | 11/1912 | Stephenson .............. E01B 13/02 |
| | | | | 238/324 |
| 5,836,638 | A | * | 11/1998 | Slocum .................. B60K 15/05 |
| | | | | 292/341.15 |

| | | | | |
|---|---|---|---|---|
| 6,986,535 | B2 | * | 1/2006 | Kawamoto ............ H01H 27/00 |
| | | | | 292/341.15 |
| 7,017,956 | B2 | * | 3/2006 | Kogami ................ E05C 19/022 |
| | | | | 292/222 |
| 7,607,523 | B2 | * | 10/2009 | Clemens ................. F16D 11/14 |
| | | | | 192/69.9 |
| 7,938,570 | B2 | * | 5/2011 | Lee ........................ F21V 21/116 |
| | | | | 362/652 |

(Continued)

FOREIGN PATENT DOCUMENTS

| | | |
|---|---|---|
| DE | 202017105252 | 10/2017 |

OTHER PUBLICATIONS

CN-117818932-A; Shen (Year: 2024).*

(Continued)

*Primary Examiner* — Nathan Cumar
(74) *Attorney, Agent, or Firm* — Frijouf, Rust & Pyle, P.A.

(57) ABSTRACT

A lock mechanism removeably couples a first object with a second object. A keyed post is coupled to the first object. A keyed receiver is coupled to the second object. An actuator is slidably coupled to the keyed receiver and abuts the keyed post for maintaining the keyed post engaged within the keyed receiver and the actuator is depressed for distancing the actuator from the keyed post for releasing the keyed post from the keyed receiver. The lock mechanism may be utilized on an unmanned aerial vehicle to removeably couple a propeller to a motor. A removable support lock may be utilized for removeably coupling a support. A tapering boom may be utilized on an unmanned aerial vehicle to couple a fuselage to a rotor lift assembly. An adjustable tether may be utilized on an unmanned aerial vehicle to support and couple a battery pack to the unmanned aerial vehicle.

13 Claims, 27 Drawing Sheets

(56) References Cited

U.S. PATENT DOCUMENTS

| | | | | |
|---|---|---|---|---|
| 7,963,575 B2 * | 6/2011 | Mayo | E06B 9/04 | |
| | | | 49/57 | |
| 8,100,441 B2 * | 1/2012 | Liao | E05C 19/022 | |
| | | | 292/99 | |
| 8,376,423 B2 * | 2/2013 | Lesjak | E05C 19/022 | |
| | | | 292/341.15 | |
| 8,449,006 B2 * | 5/2013 | Joerger | D06F 37/42 | |
| | | | 292/341.15 | |
| 8,973,956 B2 * | 3/2015 | Sambommatsu | E05C 19/022 | |
| | | | 292/341.15 | |
| 9,359,070 B2 * | 6/2016 | Caubel | B64C 27/48 | |
| D770,940 S | 11/2016 | Taylor | | |
| 9,630,703 B2 * | 4/2017 | Wang | B64C 27/32 | |
| D807,785 S | 1/2018 | Taylor | | |
| 9,926,955 B1 * | 3/2018 | Taylor | H01Q 15/165 | |
| 9,974,209 B1 * | 5/2018 | Taylor | B64C 1/00 | |
| 10,322,796 B2 * | 6/2019 | Lee | B64C 15/12 | |
| 10,745,108 B2 | 8/2020 | Nilson | | |
| 11,225,201 B2 * | 1/2022 | Moulin | F16M 13/02 | |
| 11,788,326 B1 * | 10/2023 | Taylor | E05C 1/08 | |
| | | | 292/150 | |
| 11,794,888 B1 | 10/2023 | Taylor | | |
| 2002/0096892 A1 * | 7/2002 | Sato | E05C 19/022 | |
| | | | 292/341.15 | |
| 2004/0257805 A1 * | 12/2004 | Lee | F16M 11/041 | |
| | | | 362/655 | |
| 2008/0191497 A1 * | 8/2008 | Mayo | E06B 9/04 | |
| | | | 292/169 | |
| 2014/0306467 A1 * | 10/2014 | Wollacott | E05C 17/46 | |
| | | | 292/341.15 | |
| 2015/0204367 A1 * | 7/2015 | Lin | F16B 2/10 | |
| | | | 403/327 | |
| 2016/0177606 A1 * | 6/2016 | Seles | E05D 7/12 | |
| | | | 29/434 | |
| 2017/0152035 A1 * | 6/2017 | Zhao | B64U 80/20 | |
| 2018/0178922 A1 * | 6/2018 | Pilskalns | B64U 30/292 | |
| 2019/0144115 A1 * | 5/2019 | Chen | B64C 25/32 | |
| | | | 244/118.1 | |
| 2020/0347860 A1 * | 11/2020 | Teague | F16B 5/002 | |
| 2022/0113758 A1 * | 4/2022 | Kasichainula | G06F 1/14 | |
| 2022/0119102 A1 * | 4/2022 | Shaanan | B64C 27/59 | |
| 2022/0219815 A1 * | 7/2022 | Ciripompa | B64C 11/32 | |
| 2024/0288015 A1 * | 8/2024 | Taylor | F16B 1/00 | |

OTHER PUBLICATIONS

CN-209305848-U; Luo (Year: 2019).*
WO-2019027172-A1; Yoon (Year: 2019).*
WO-2019142961-A1; Chi (Year: 2019).*
WO-2022066390-A1; Dornisch (Year: 2022).*
WO-2022077152-A1; Zhou (Year: 2022).*
CN-105109679-A; Zhang (Year: 2015).*

* cited by examiner

454

450

452

454

454

UNMANNED AERIAL VEHICLE

CROSS-REFERENCE TO RELATED APPLICATIONS

This application claims benefit of U.S. Patent Provisional application No. 63/402,589 filed Aug. 31, 2022. All subject matter set forth in provisional application No. 63/402,589 is hereby incorporated by reference into the present application as if fully set forth herein.

This application claims benefit of U.S. Patent Provisional application No. 63/448,240 filed Feb. 24, 2023. All subject matter set forth in provisional application No. 63/448,240 is hereby incorporated by reference into the present application as if fully set forth herein.

BACKGROUND OF THE INVENTION

Field of the Invention

This invention relates to aerial vehicles and more particularly to an improved unmanned aerial vehicle.

Background of the Invention

Unmanned aerial vehicles (UAV) are types of aircraft that fly with no onboard pilots, crew or passengers. UAVs comprise both autonomous and remotely piloted vehicles. The earliest UAVs were balloons loaded with explosives, which were used by the Austrians in the mid 1800's. Shortly after World War I radio controlled aircraft were developed. Later developments in this technology led to more sophisticated UAV's which included remotely controlled UAVs as well as autonomously guided vehicles.

Drone technology led to the development of more complex systems, with the capability to sustain flight over greater distances and longer flight times. These vehicles proved to be a great asset in military reconnaissance activities. In the 1980's, smaller combat battlefield drones became part of the combat weapon arsenal.

The development of miniature UAVs utilizing both fixed wing and helicopter technologies has substantially advanced the field of UAVs. The development of multi rotor helicopter UAVs simplified the skill required to remotely control these vehicles. These new UAVs have the capability to carry a wide variety of payloads, which include photographic equipment, radiation and chemical detection devices and the like. The availability of micro video devices allows the operator to view the scene of the UAV from a remote location.

In spite of the major advances in UAV technology that have been accomplished, as is well known by those skilled in the art, there remains a need for an easy to transport and rugged.

There have been many in the prior art who have attempted to solve these problems with varying degrees of success. None, however completely satisfies the requirements for a complete solution to the aforestated problem.

Therefore, it is an object of the present invention to provide an improved unmanned aerial vehicle (UAV) that is capable of carrying a variety of payloads.

Another object of this invention is to provide an improved unmanned aerial vehicle (UAV) wherein the propellers may be easily and quickly replaced without the use of tools.

Another object of this invention is to provide an improved unmanned aerial vehicle (UAV) wherein the legs may be easily and quickly replaced without the use of tools.

Another object of this invention is to provide an improved unmanned aerial vehicle (UAV) wherein the booms are streamlined and create lift upon an angular and forward displacement of the unmanned aerial vehicle (UAV) through the air.

Another object of this invention is to provide an improved unmanned aerial vehicle (UAV) including a stiffer plate to prevent flexing of the body.

Another object of this invention is to provide an improved unmanned aerial vehicle (UAV) including a strap maintains the battery pack with the body.

Another object of this invention is to provide an improved unmanned aerial vehicle (UAV) that is easy to transport.

Another object of this invention is to provide an improved unmanned aerial vehicle (UAV) that is cost effectively produced.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved lock mechanism for removeably coupling a first object with a second object includes a keyed post coupled to the first object. A keyed receiver is coupled to the second object. An actuator is slidably coupled to the keyed receiver and abuts the keyed post for maintaining the keyed post engaged within the keyed receiver and the actuator is depressed for distancing the actuator from the keyed post for releasing the keyed post from the keyed receiver.

In another embodiment of the invention, an unmanned aerial vehicle includes a fuselage defining a fuselage chamber. A first boom extends between a proximal end and a distal end. The proximal end of the first boom is coupled to the fuselage. A first rotor lift assembly is coupled to the distal end of the first boom for providing a first lifting force. A second boom extends between a proximal end and a distal end. The proximal end of the second boom is coupled to the fuselage. A second rotor lift assembly is coupled to the distal end of the second boom for providing a second lifting force. A third boom extends between a proximal end and a distal end. The proximal end of the third boom is coupled to the fuselage. A third rotor lift assembly is coupled to the distal end of the third boom for providing a third lifting force. A fourth boom extends between a proximal end and a distal end. The proximal end of the fourth boom is coupled to the fuselage. A fourth rotor lift assembly is coupled to the distal end of the fourth boom for providing a fourth lifting force. The first rotor lift includes a first motor and a first propeller. A first propeller connector removeably couples the first propeller to the first motor. The first propeller connector includes a first keyed post coupled to the first motor and a first keyed receiver coupled to the first propeller. A first actuator is slidably coupled to the first keyed receiver and abuts the first keyed post for maintaining the first keyed post engaged within the first keyed receiver and the first actuator is depressed for distancing the first actuator from the first keyed post for releasing the first keyed post from the first keyed receiver. The second rotor lift includes a second motor and a second propeller. A second propeller connector removeably couples the second propeller to second motor. The second propeller connector includes a second keyed post coupled to the second motor and a second keyed receiver is coupled to second propeller. A second actuator is slidably coupled to the second keyed receiver and abuts the second keyed post for maintaining the second keyed post engaged within the second keyed receiver and the second actuator is depressed for distancing the second actuator from the second keyed post for releasing the second keyed post from the second keyed receiver. The third rotor lift includes a third motor and a third propeller. A third propeller connector removeably couples the third propeller to the third motor. The third propeller connector includes a third keyed post coupled to the third motor and a third keyed receiver coupled to the third propeller. A third actuator is slidably coupled to the third keyed receiver and abuts the third keyed post for maintaining the third keyed post engaged within the third keyed receiver and the third actuator is depressed for distancing the third actuator from the third keyed post for releasing the third keyed post from the third keyed receiver. The fourth rotor lift includes a fourth motor and a fourth propeller. A fourth propeller connector removeably couples the fourth propeller to fourth first motor. The fourth propeller connector includes a fourth keyed post coupled to the fourth motor and a fourth keyed receiver coupled to fourth first propeller. A fourth actuator is slidably coupled to the fourth keyed receiver and abuts the fourth keyed post for maintaining the fourth keyed post engaged within the fourth keyed receiver and the fourth actuator is depressed for distancing the fourth actuator from the fourth keyed post for releasing the fourth keyed post from the fourth keyed receiver.

In another embodiment of the invention, the first, second, third and fourth rotor lift assembly extend from an upper end and a lower end. The lower end of the first, second, third and fourth rotor lift including a rotor couple. A support extends from an upper end and a lower end. The upper end of the support includes a support couple. The support couple engages with the rotor couple for defining a removable support lock. The support includes a rod for permitting lateral displacement between the upper end and the lower end of the support and defining a lateral force absorbing device in the first, second, third and fourth rotor lift.

In another embodiment of the invention, the first, second, third and fourth booms define a reduced height, a reduced width and a reduced depth from the proximal end to the distal end for defining a tapered height boom, a tapered width boom and a tapered depth boom respectively and reducing weight of the booms, reducing surface area of the booms and improving aerodynamics.

In another embodiment of the invention, the first, second, third and fourth booms define a reduced height, a reduced width and a reduced depth from the proximal end to the distal end for defining a tapered height boom, a tapered width boom and a tapered depth boom respectively and reducing weight of the booms, reducing surface area of the booms and improving aerodynamics.

In another embodiment of the invention, a battery pack is coupled to the fuselage for providing an electrical current to an electronic controller system and the first, second, third and fourth rotor lift assemblies. An adjustable tether is coupled to the fuselage and encircles the battery pack for supporting and coupling the battery pack to the fuselage.

In another embodiment of the invention, a stiffing plate is coupled to the fuselage for preventing deflection of the fuselage.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts through-out the several Figures of the drawings.

DETAILED DISCUSSION

Figure 1:
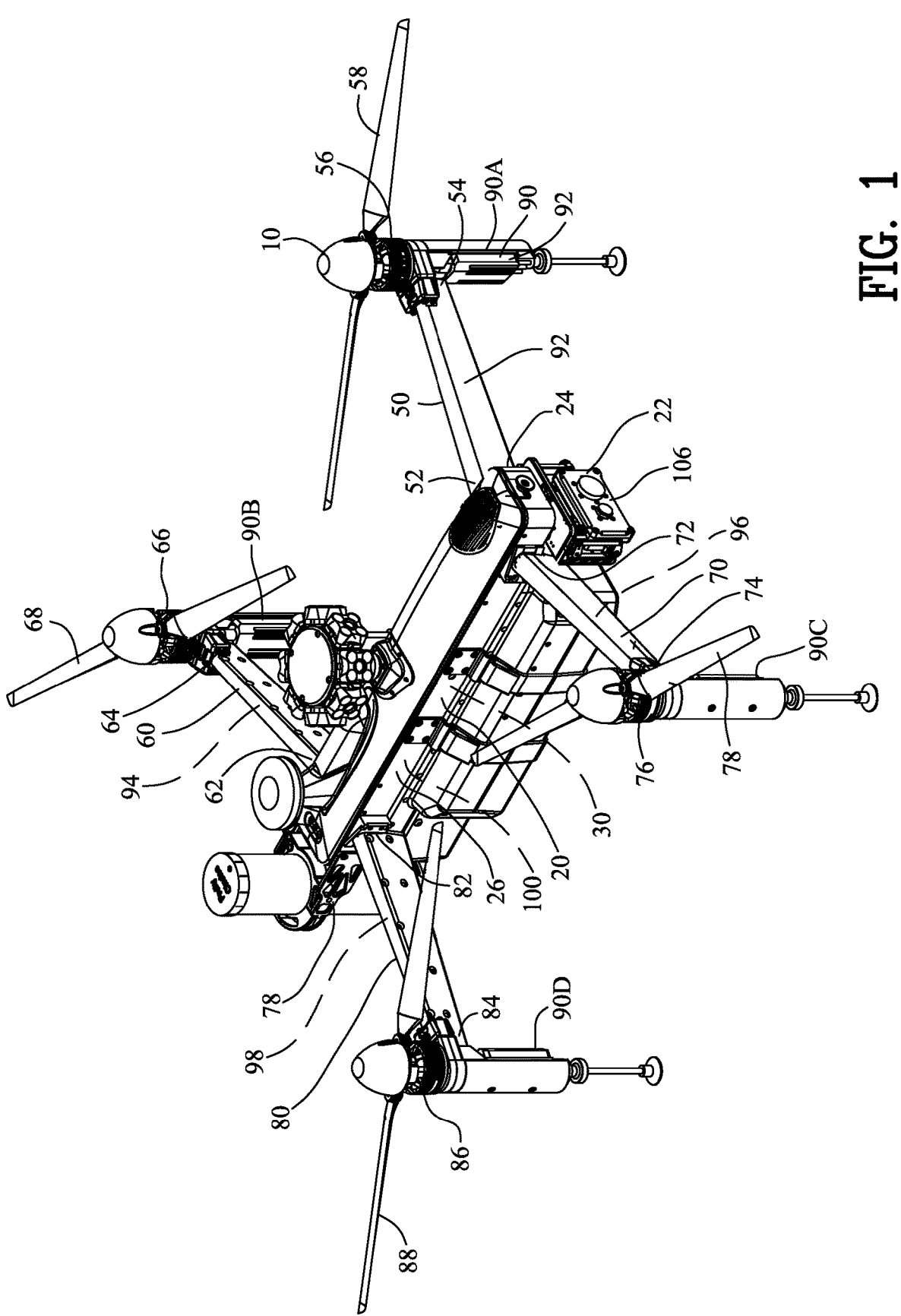
FIG. 1 is an upper left front isometric view of an unmanned aerial vehicle incorporating the present invention.
Figure 2:
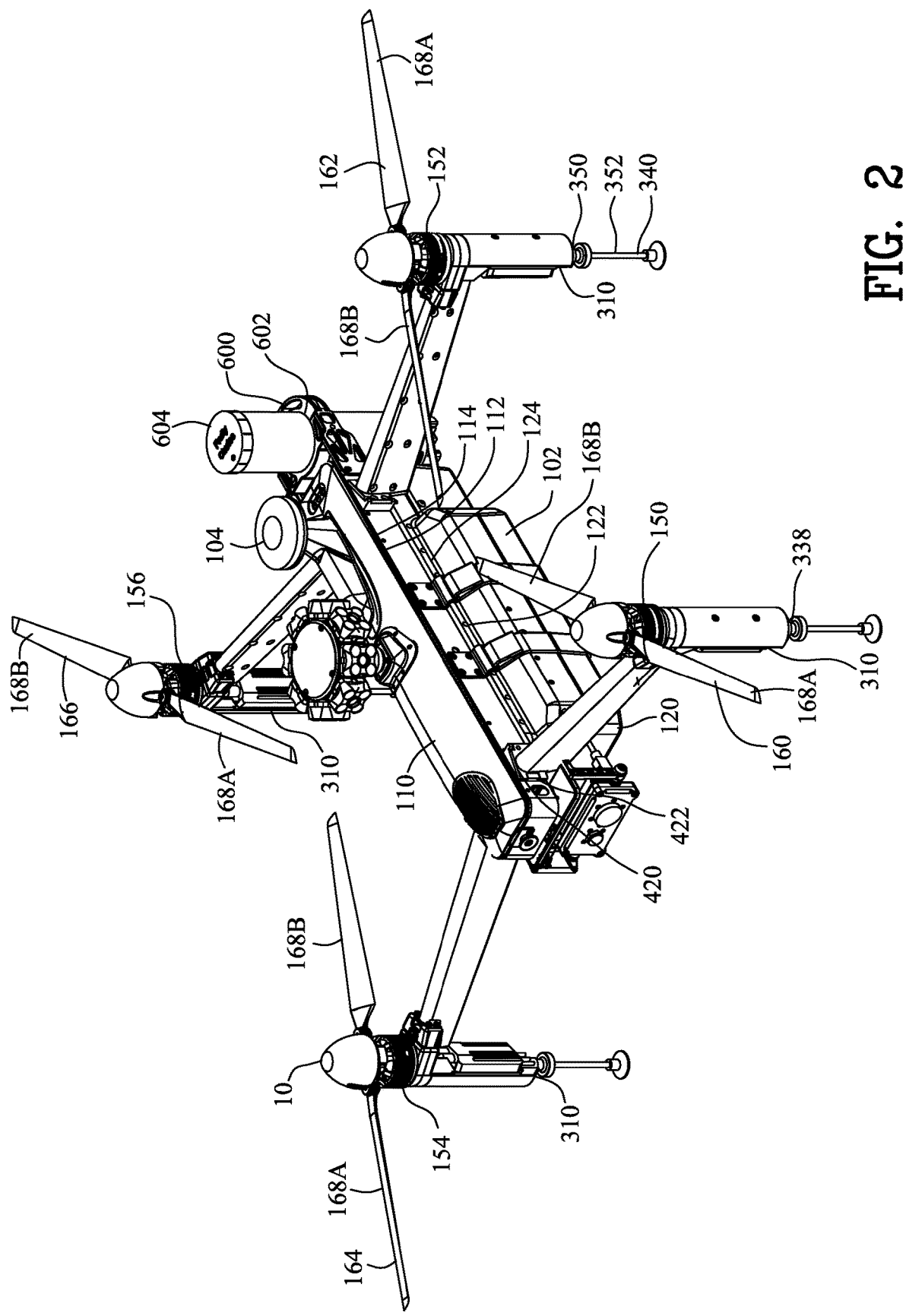
FIG. 2 is a upper right front isometric view of FIG. 1.
Figure 3:
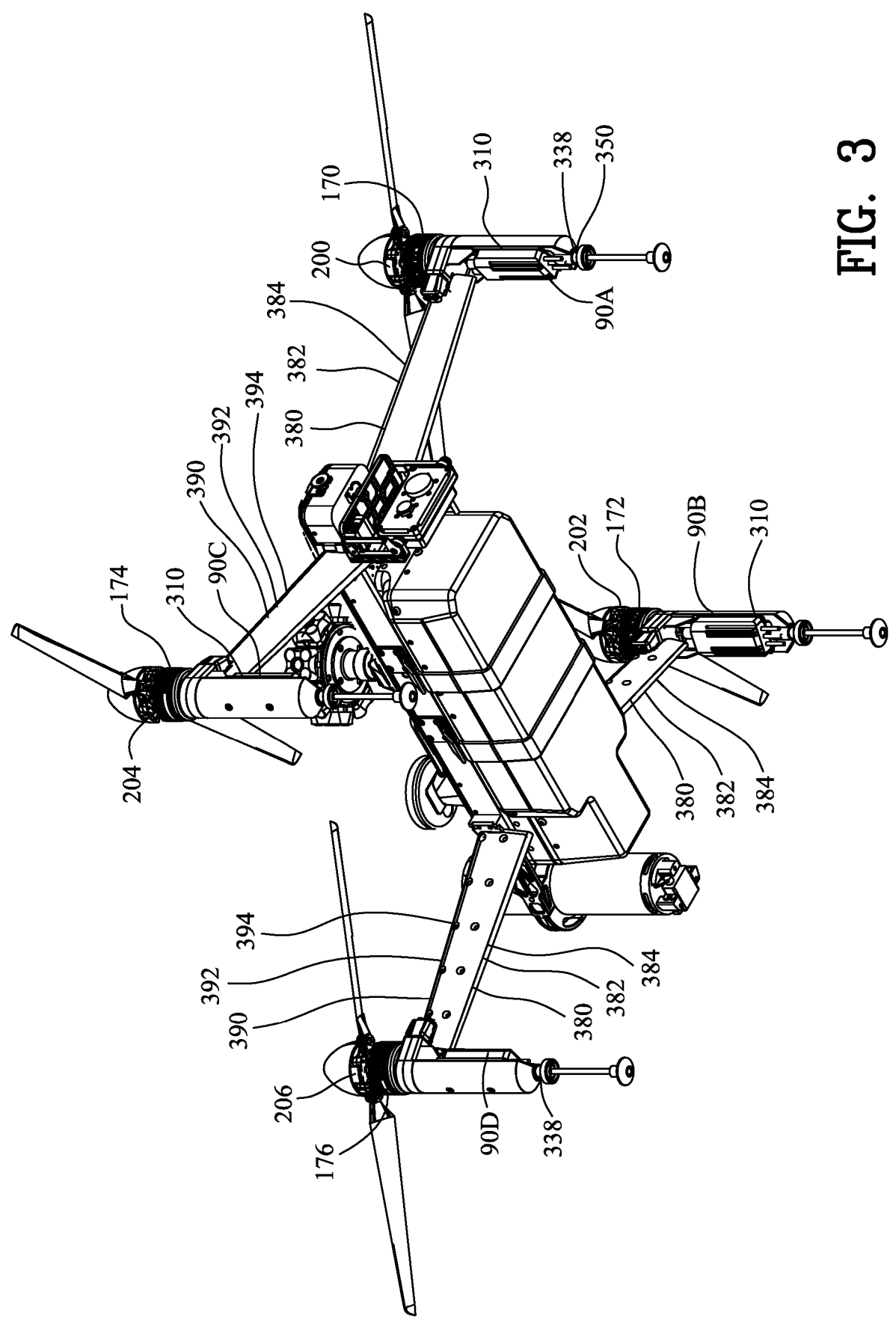
FIG. 3 is a lower left front isometric view of FIG. 1.
Figure 4:
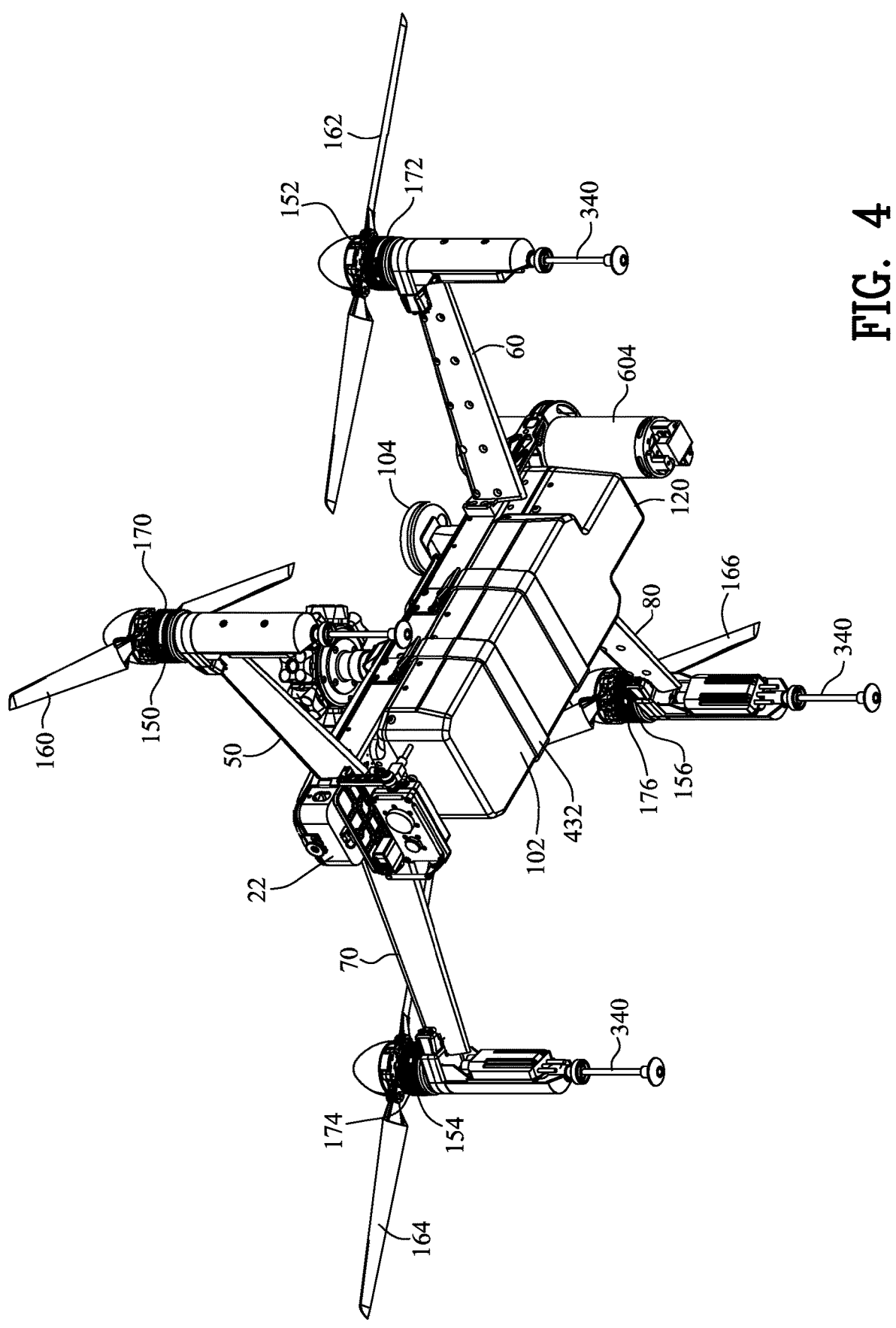
FIG. 4 is a lower right front isometric view of FIG. 1.
Figure 5:
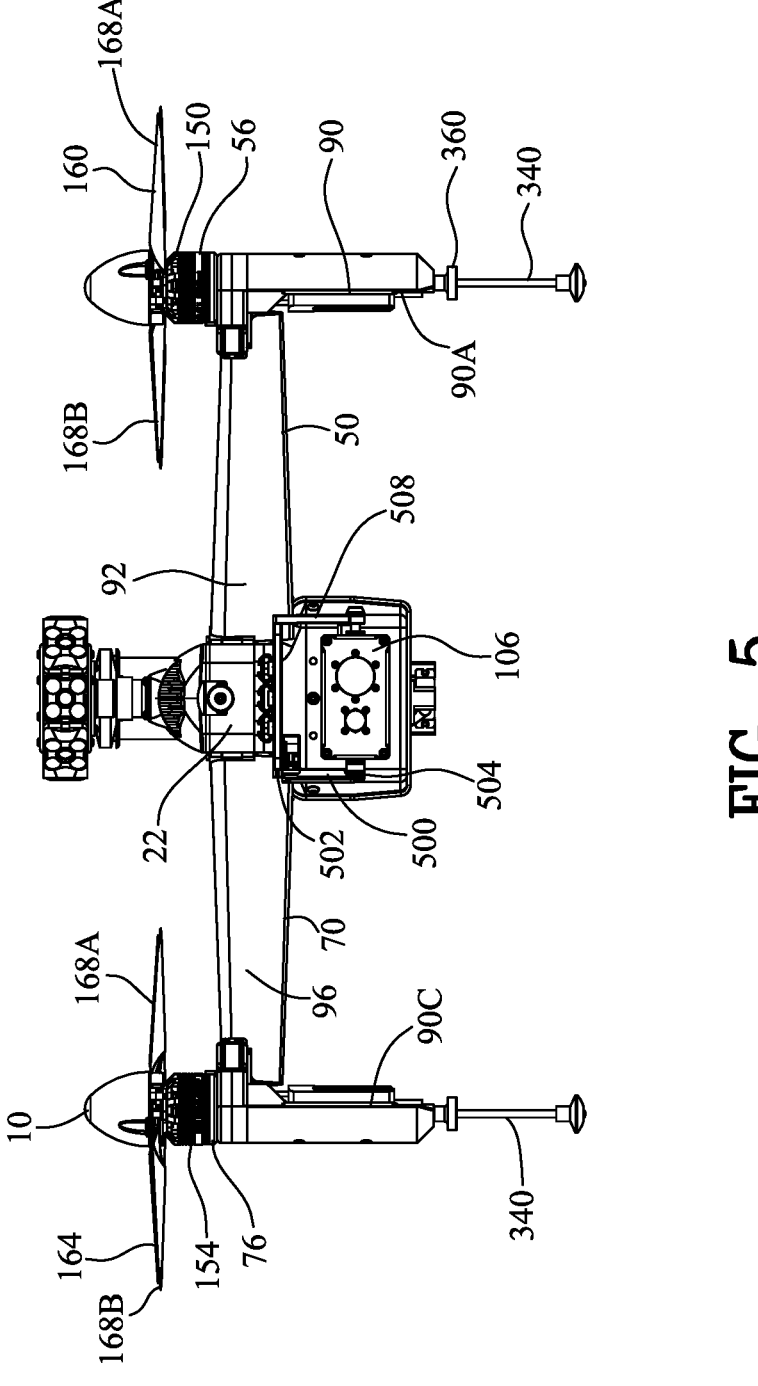
FIG. 5 is a front view of FIG. 1.
Figure 6:
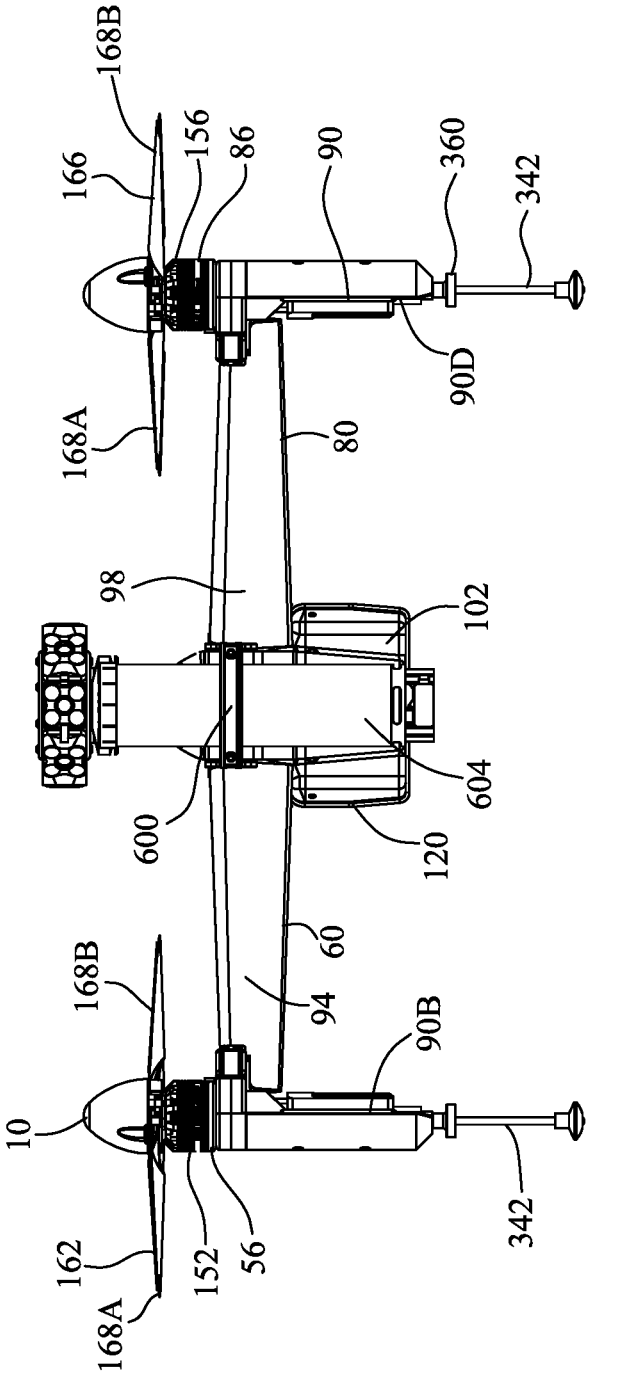
FIG. 6 is a rear view of FIG. 1.
Figure 7:
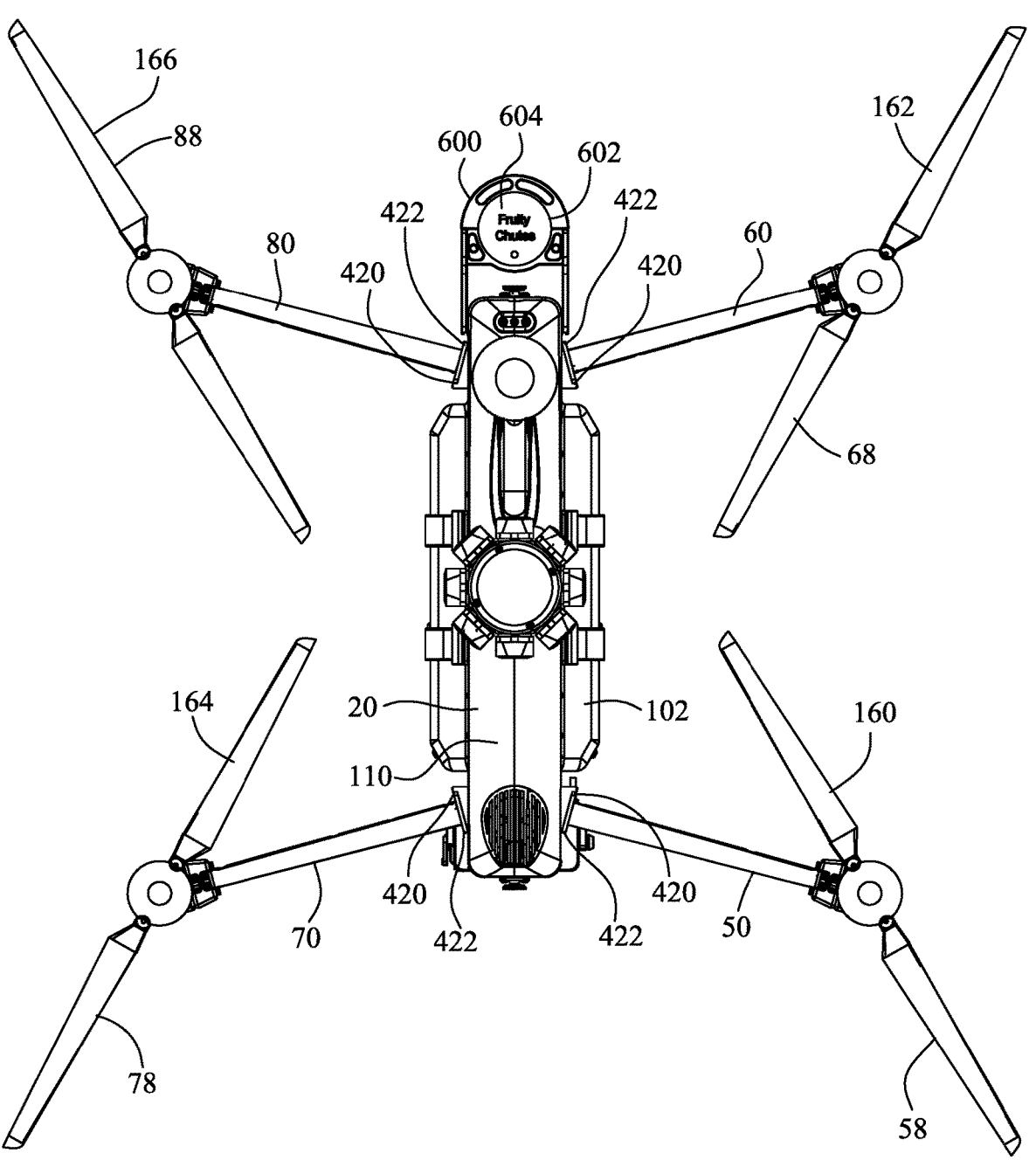
FIG. 7 is a top view of FIG. 1.
Figure 8:
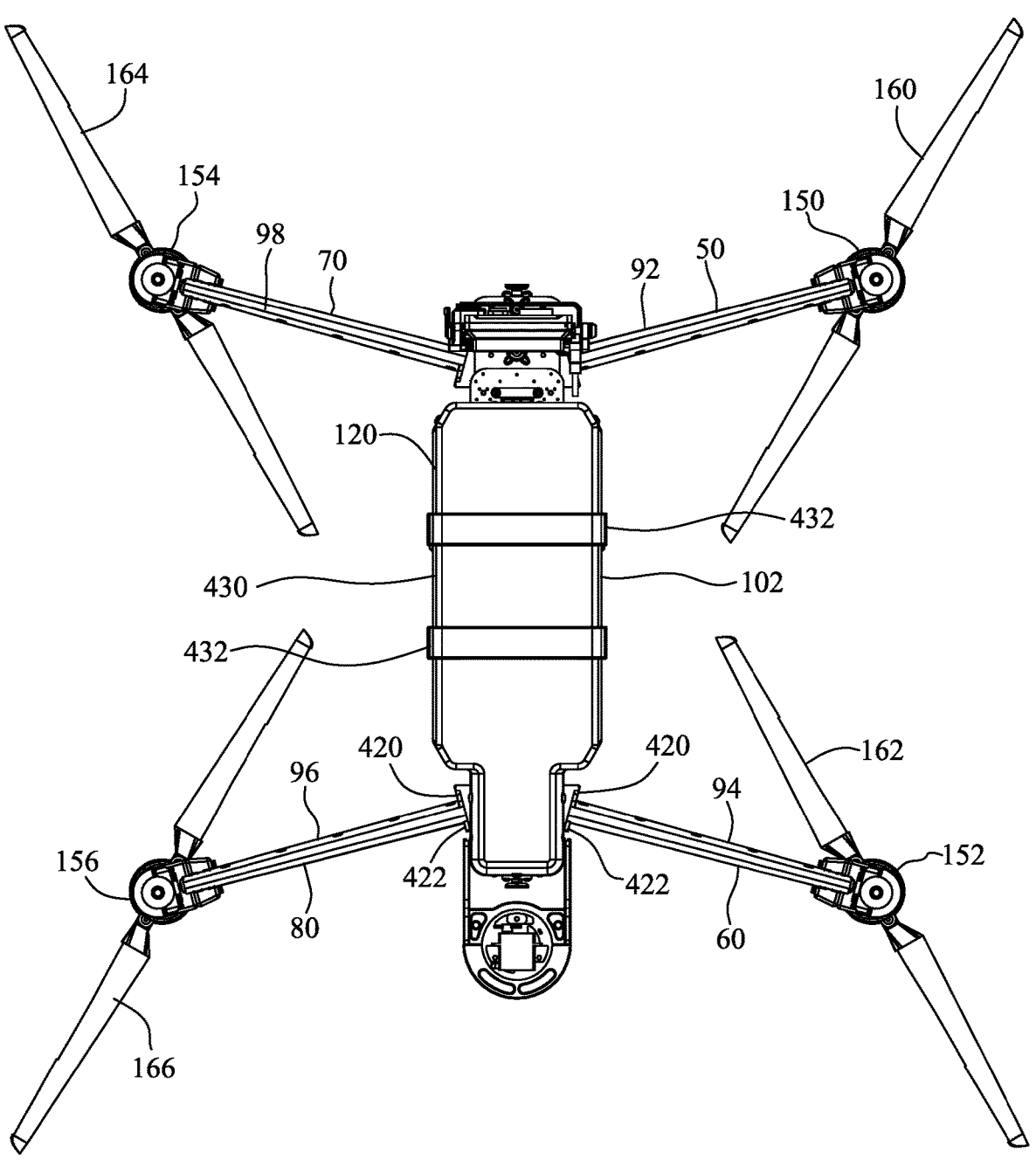
FIG. 8 is a bottom view of FIG. 1.
Figure 9:
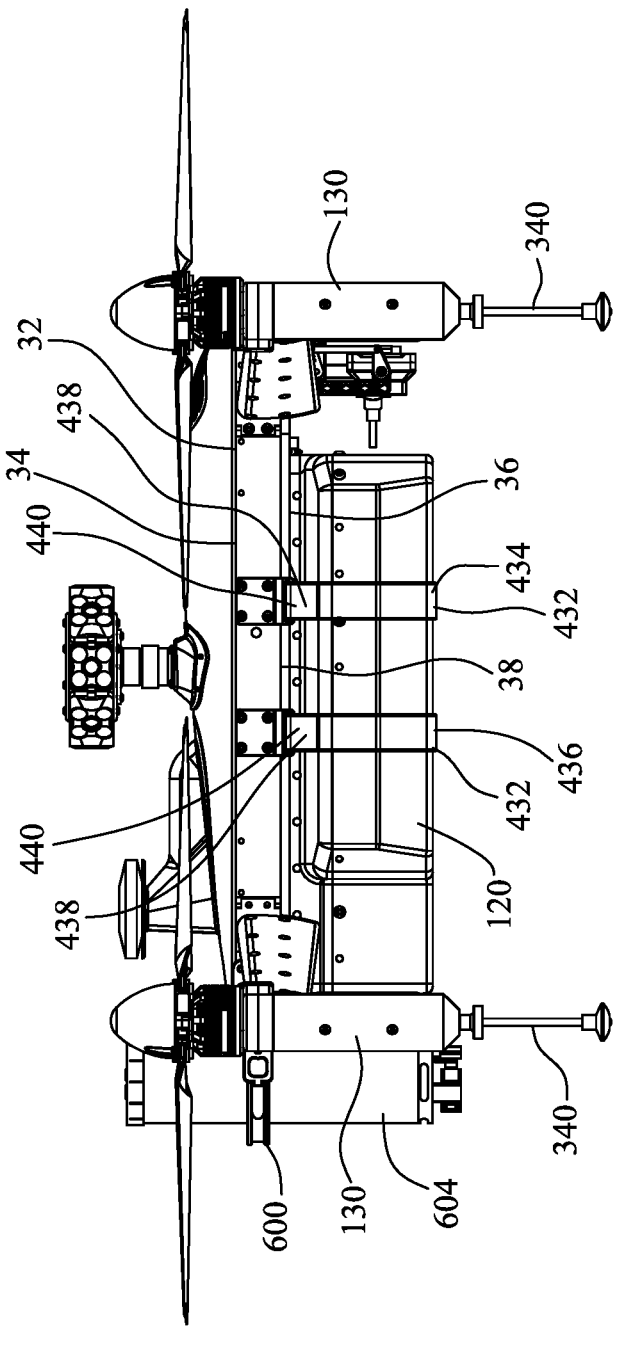
FIG. 9 is a left side view of FIG. 1.
Figure 10:
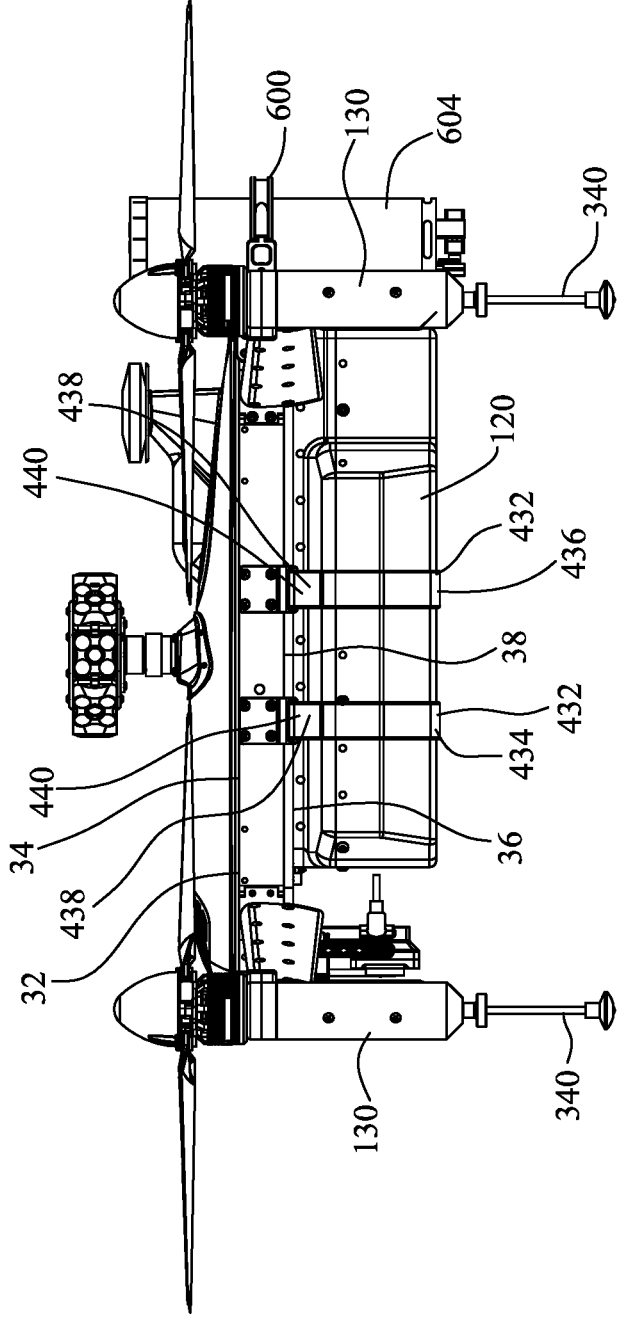
FIG. 10 is a right side view of FIG. 1.
Figure 11:
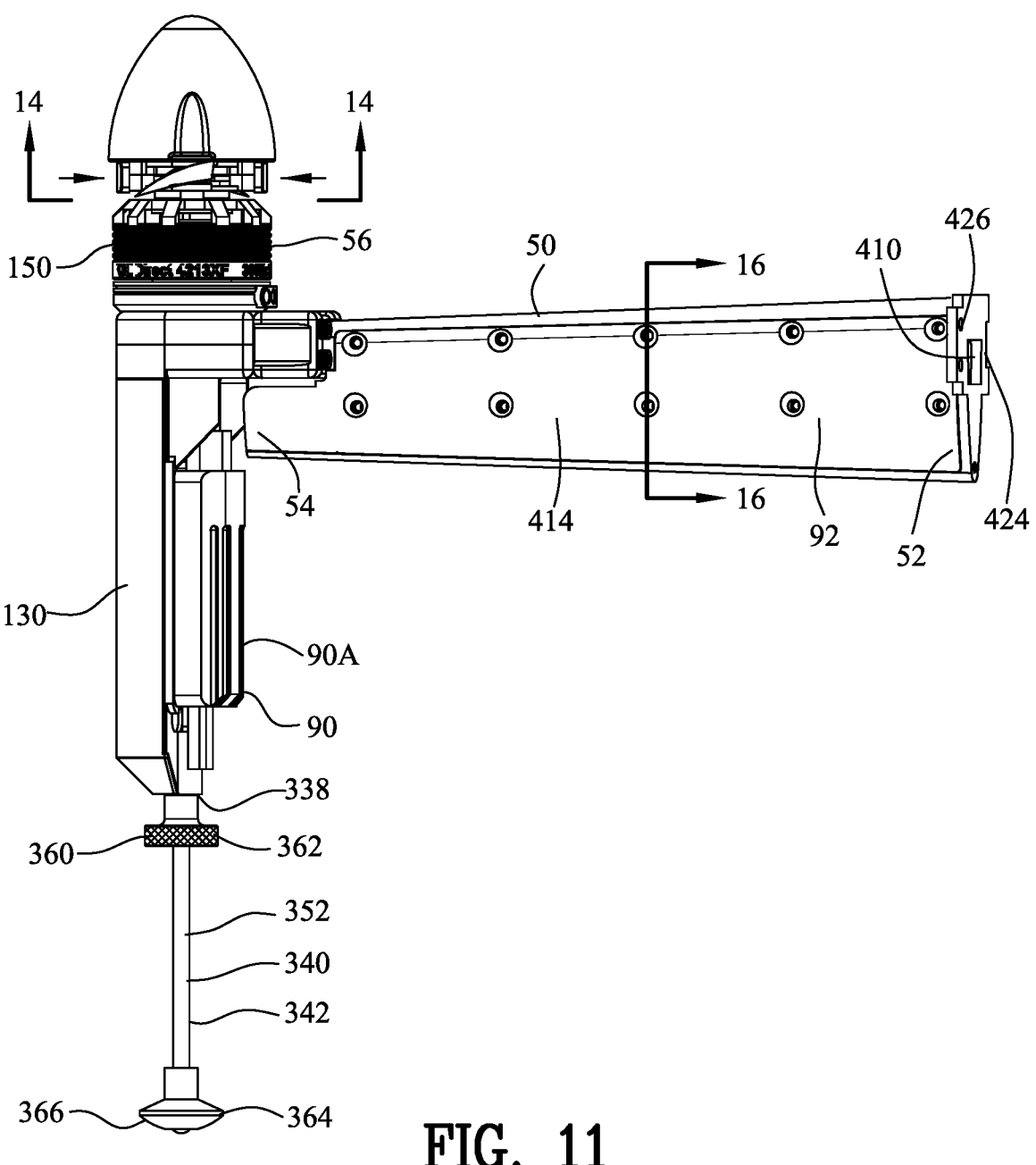
FIG. 11 is an enlarged portion of FIG. 1 illustrating a boom coupled to a rotor lift assembly.
Figure 12:
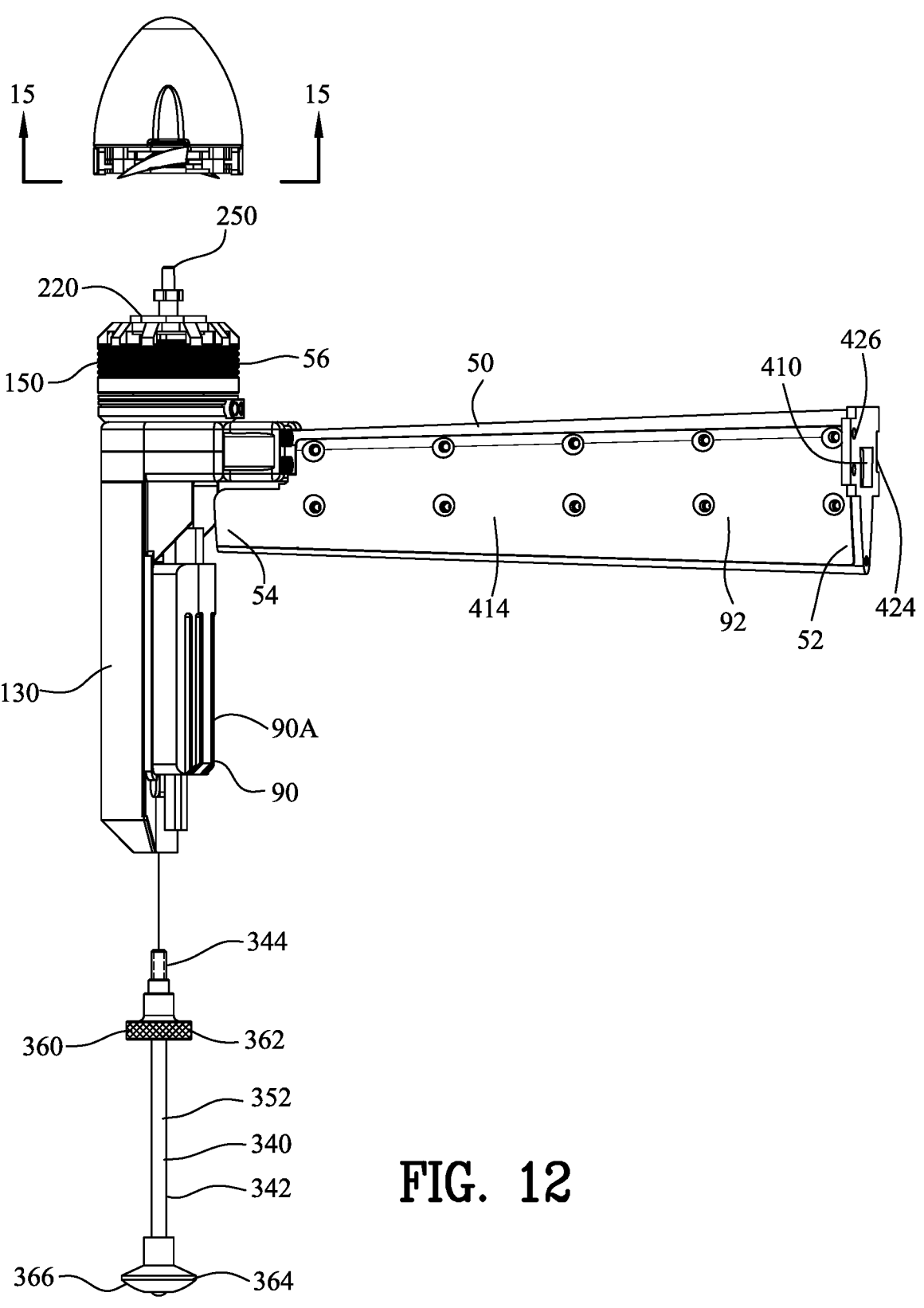
FIG. 12 is view similar to FIG. 11 illustrating a propeller removed from a motor and a support removed from the rotor left assembly.
Figure 13:
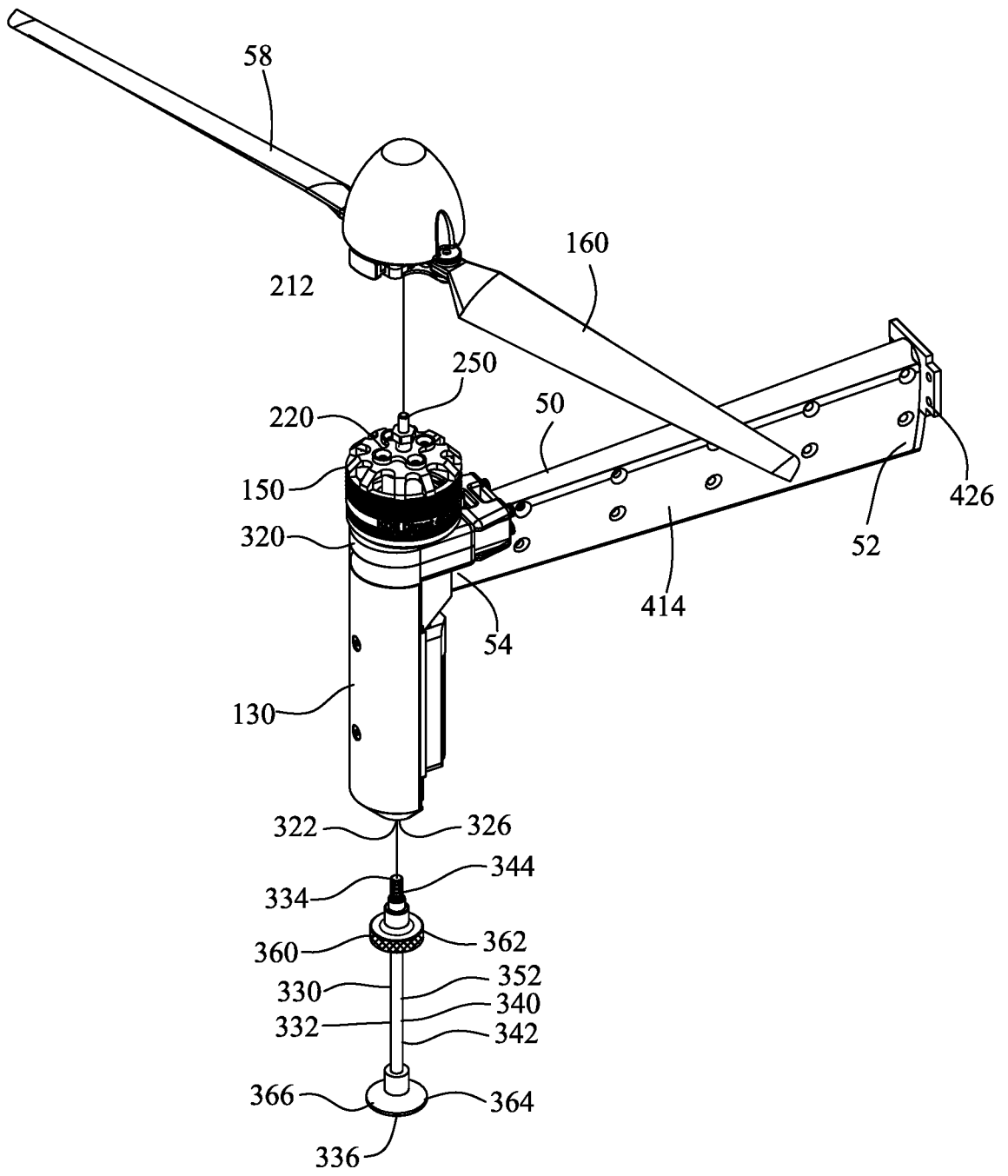
FIG. 13 is an upper isometric view of FIG. 12.
Figures 14, 15:
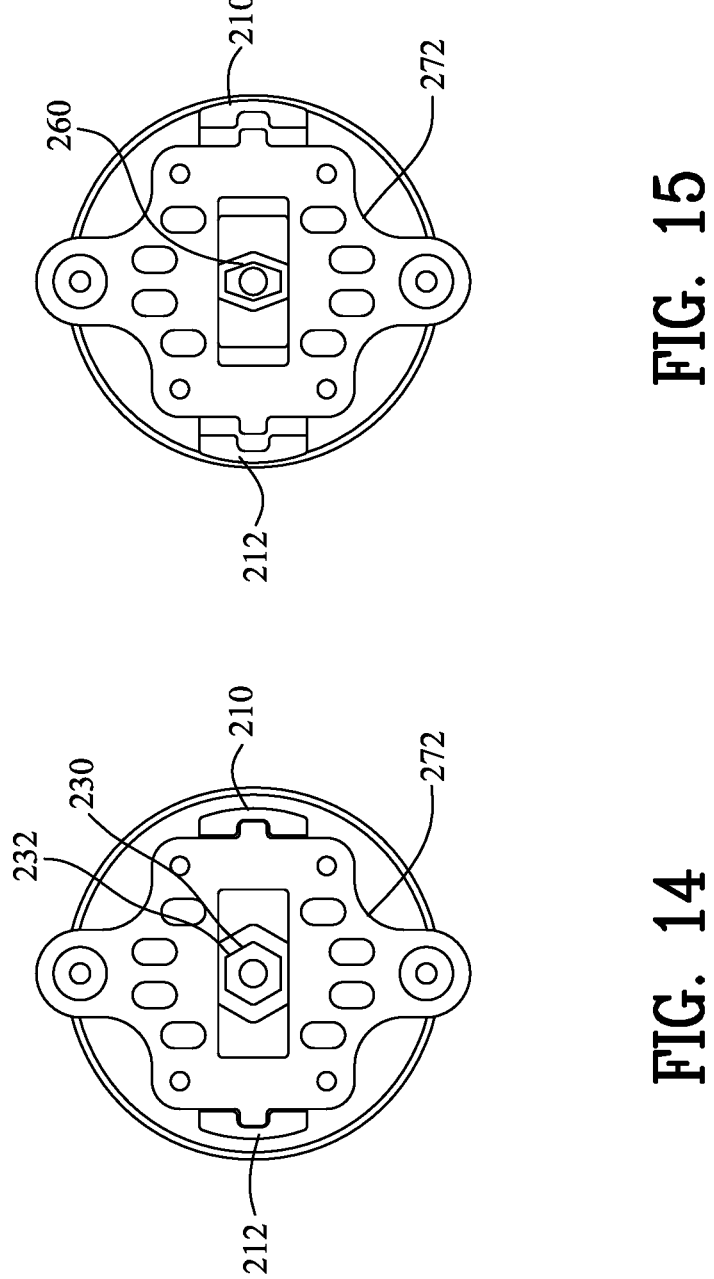
FIG. 14 is a sectional view along line 14-14 in FIG. 11.
FIG. 15 is a view along line 15-15 in FIG. 12.
Figure 17:
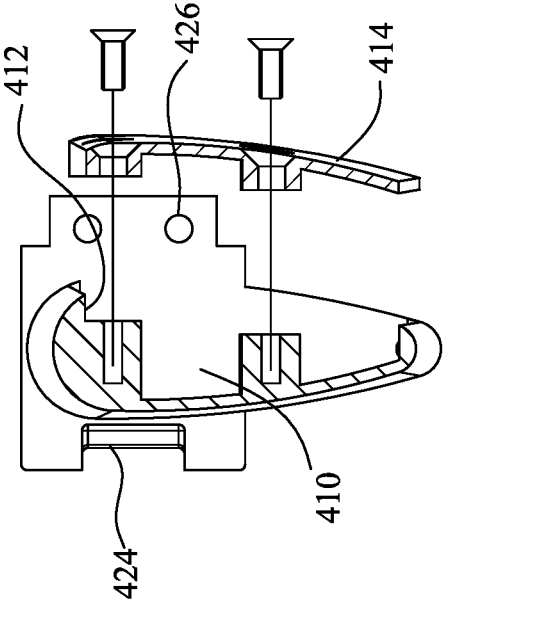
FIG. 17 is a view similar to FIG. 16 illustrating a boom cover plate disengaged from a boom.
Figure 16:
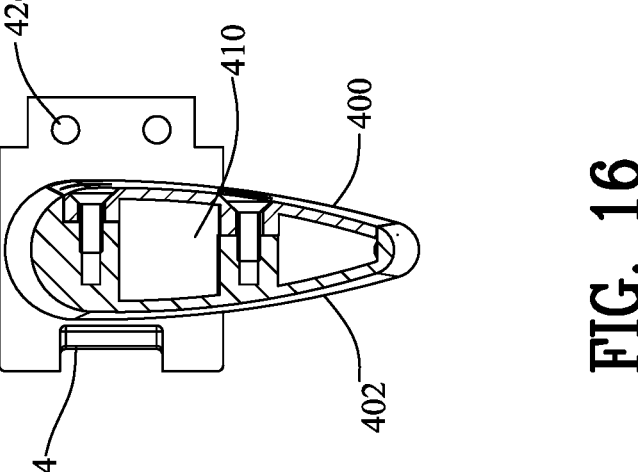
FIG. 16 is a sectional view along line 16-16 in FIG. 11.
Figure 18:
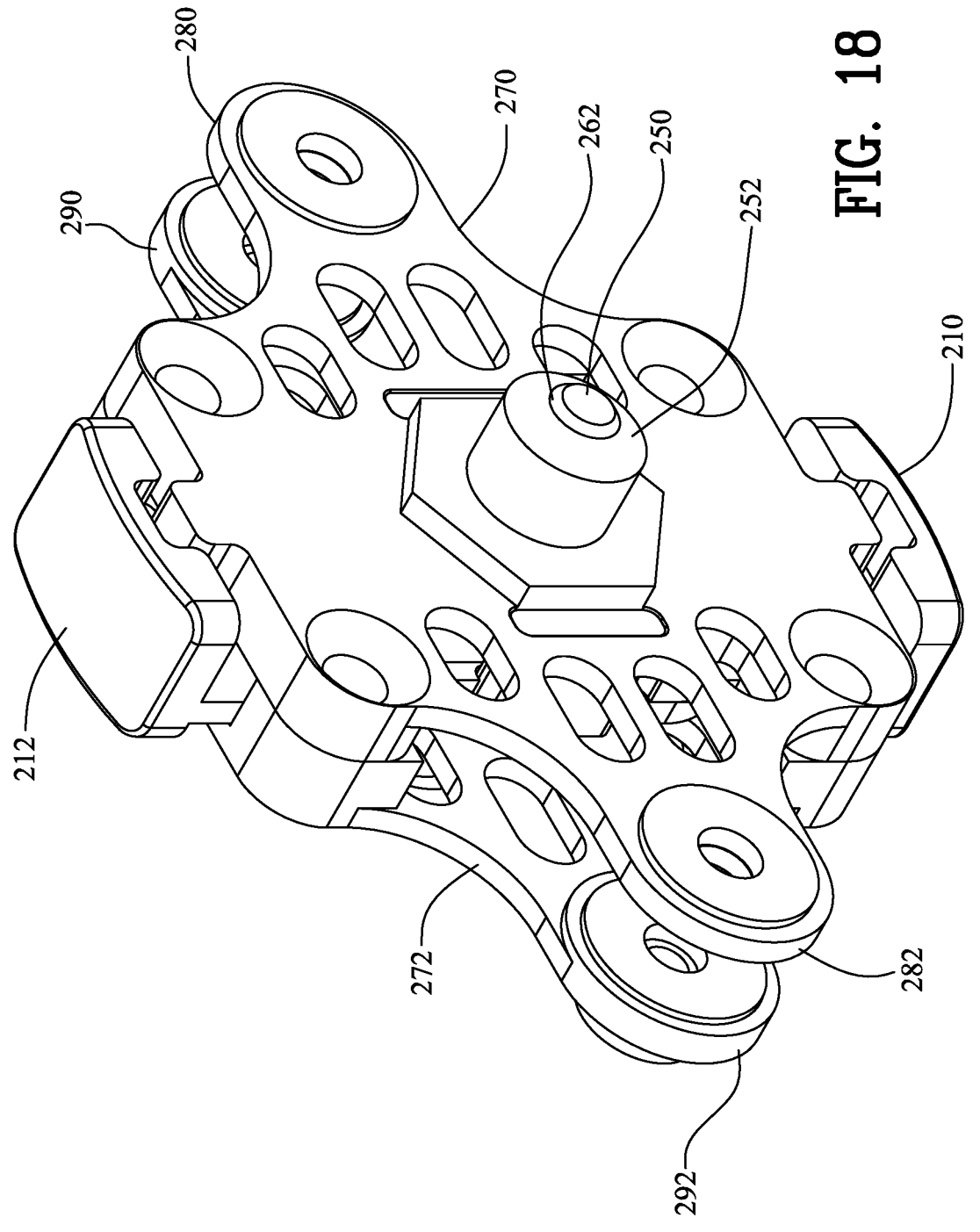
FIG. 18 is a top isometric view of a lock mechanism.
Figures 19, 20, 21:
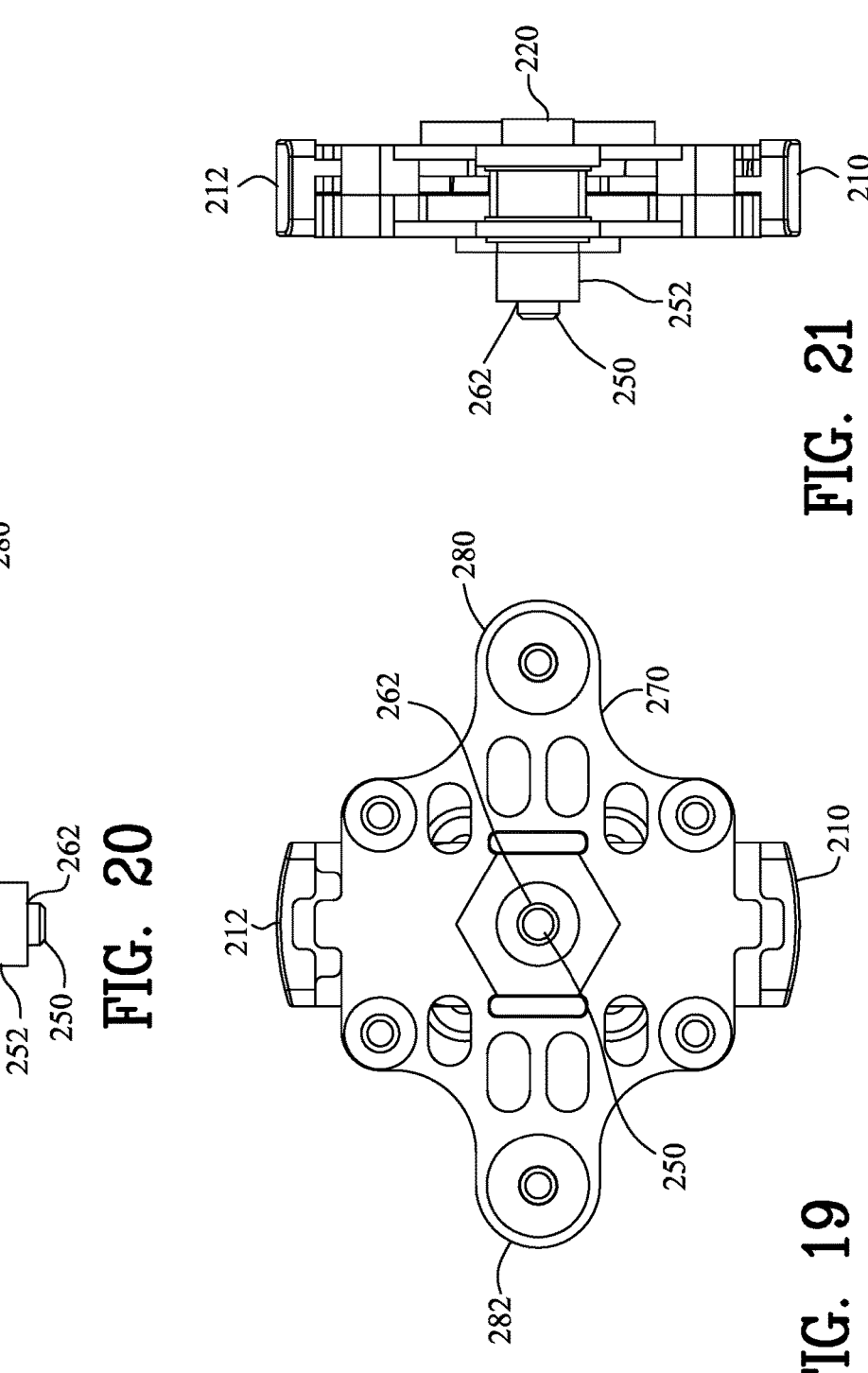
FIG. 19 is a top view of FIG. 18.
FIG. 20 is a front view of FIG. 19.
FIG. 21 is a side view of FIG. 19.
Figure 22:
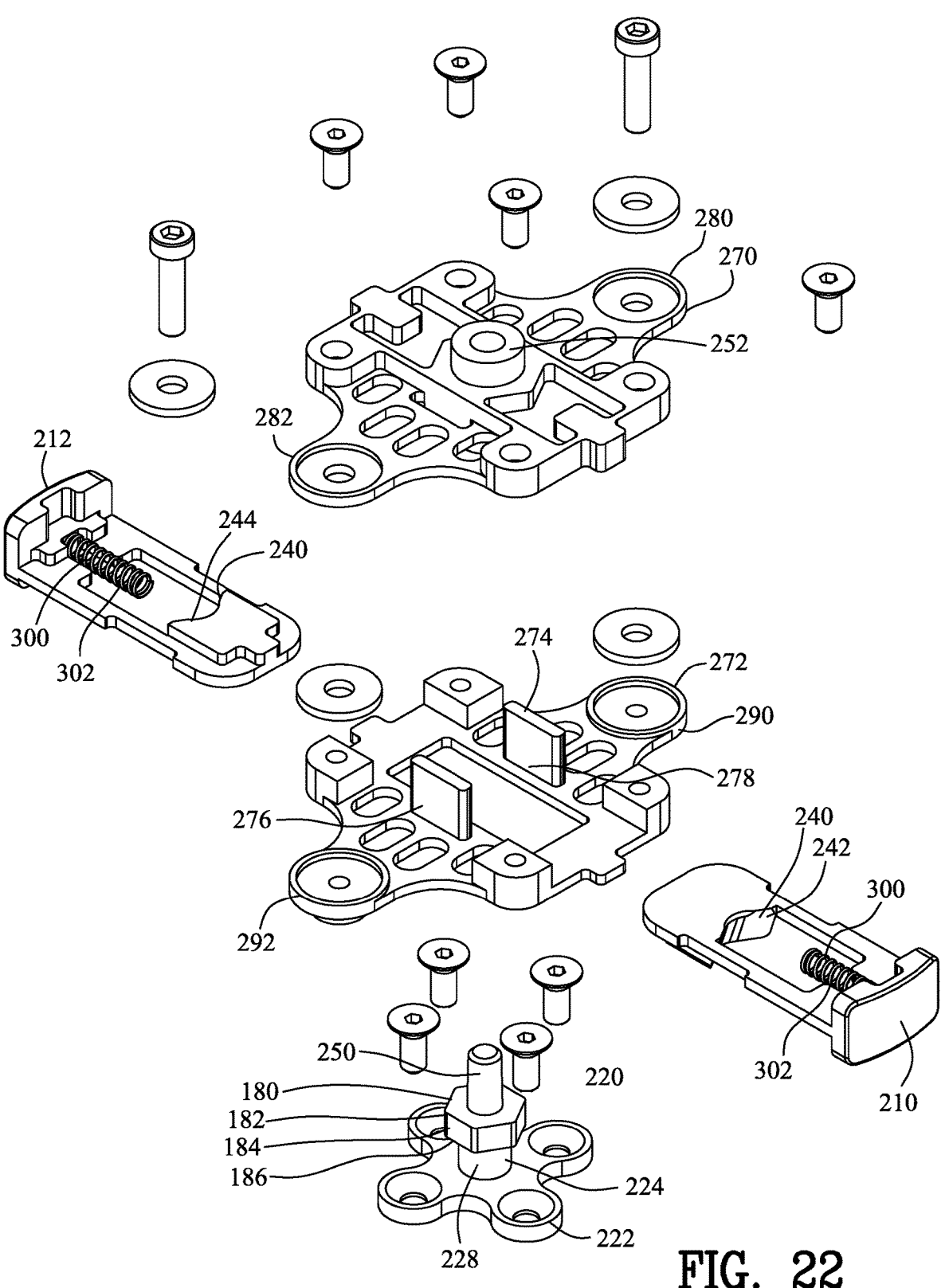
FIG. 22 is an exploded view of FIG. 18.
Figures 23, 24:
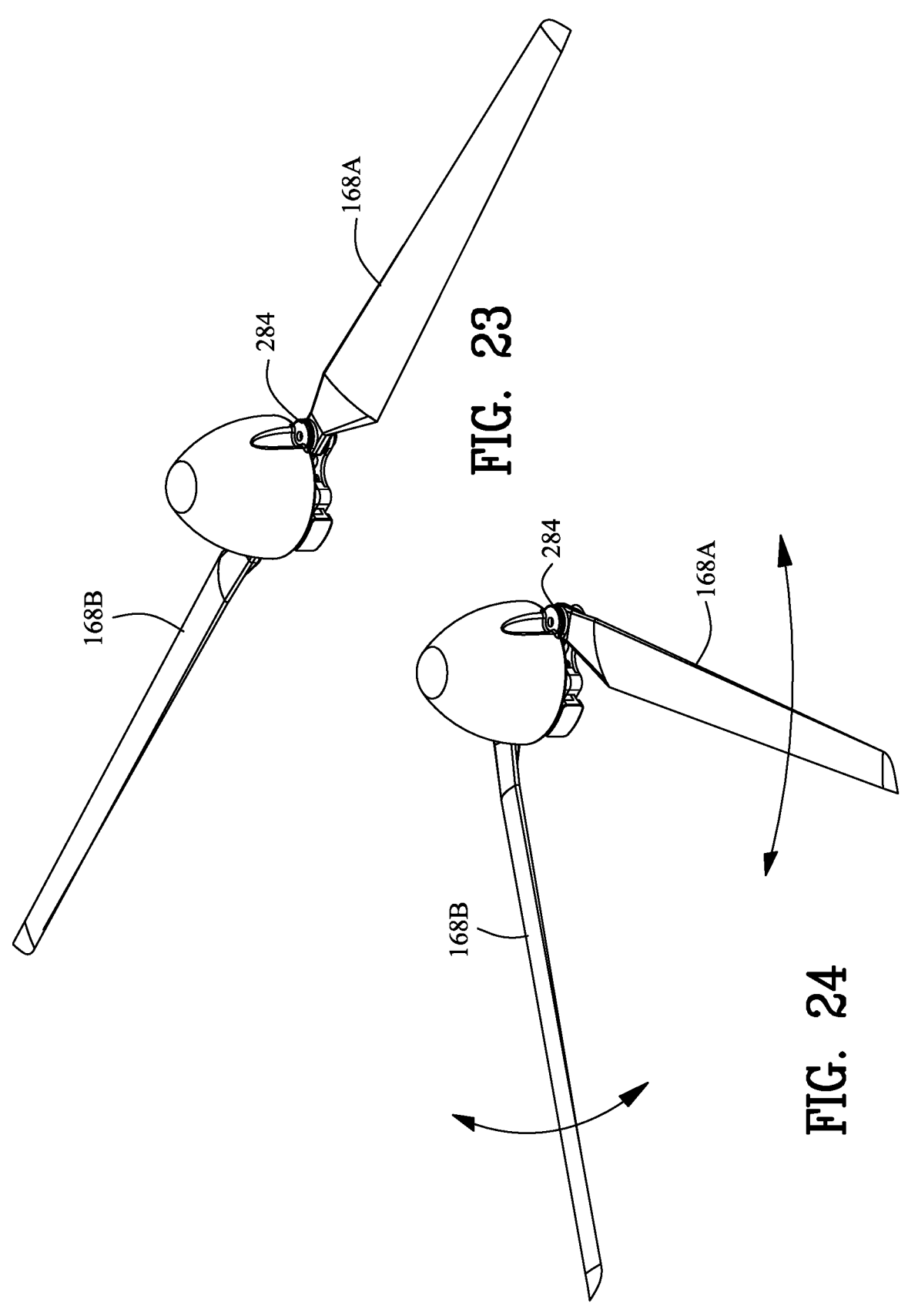
FIG. 23 is an enlarged portion of FIG. 1 illustrating a propeller assembly.
FIG. 24 is a view similar to FIG. 23 illustrating a primary propeller and a secondary propeller pivoting relative to the propeller assembly.
Figure 25:
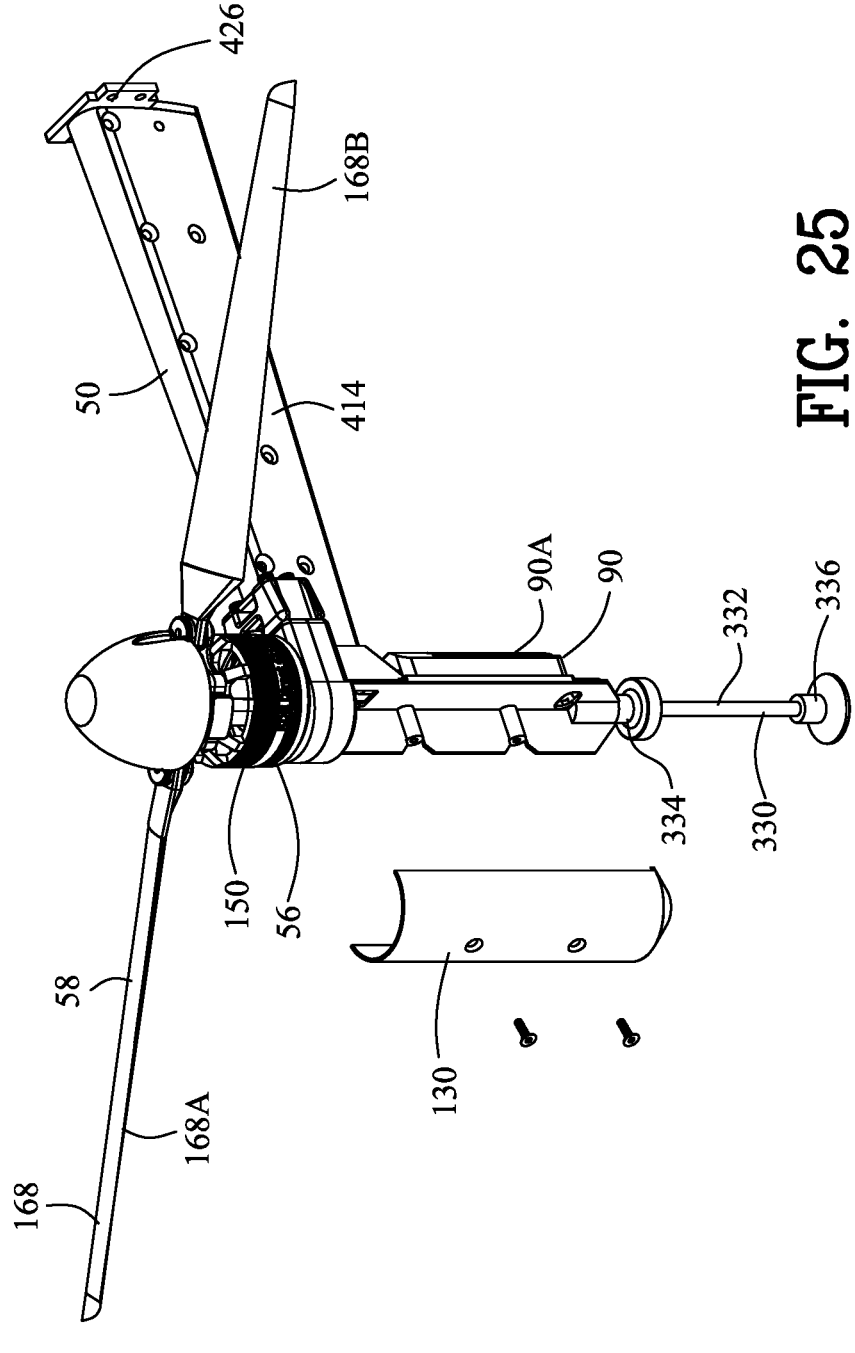
FIG. 25 is an enlarged portion of FIG. 1 illustrating a rotor lift assembly cap removed from the rotor lift assembly.
Figure 26:
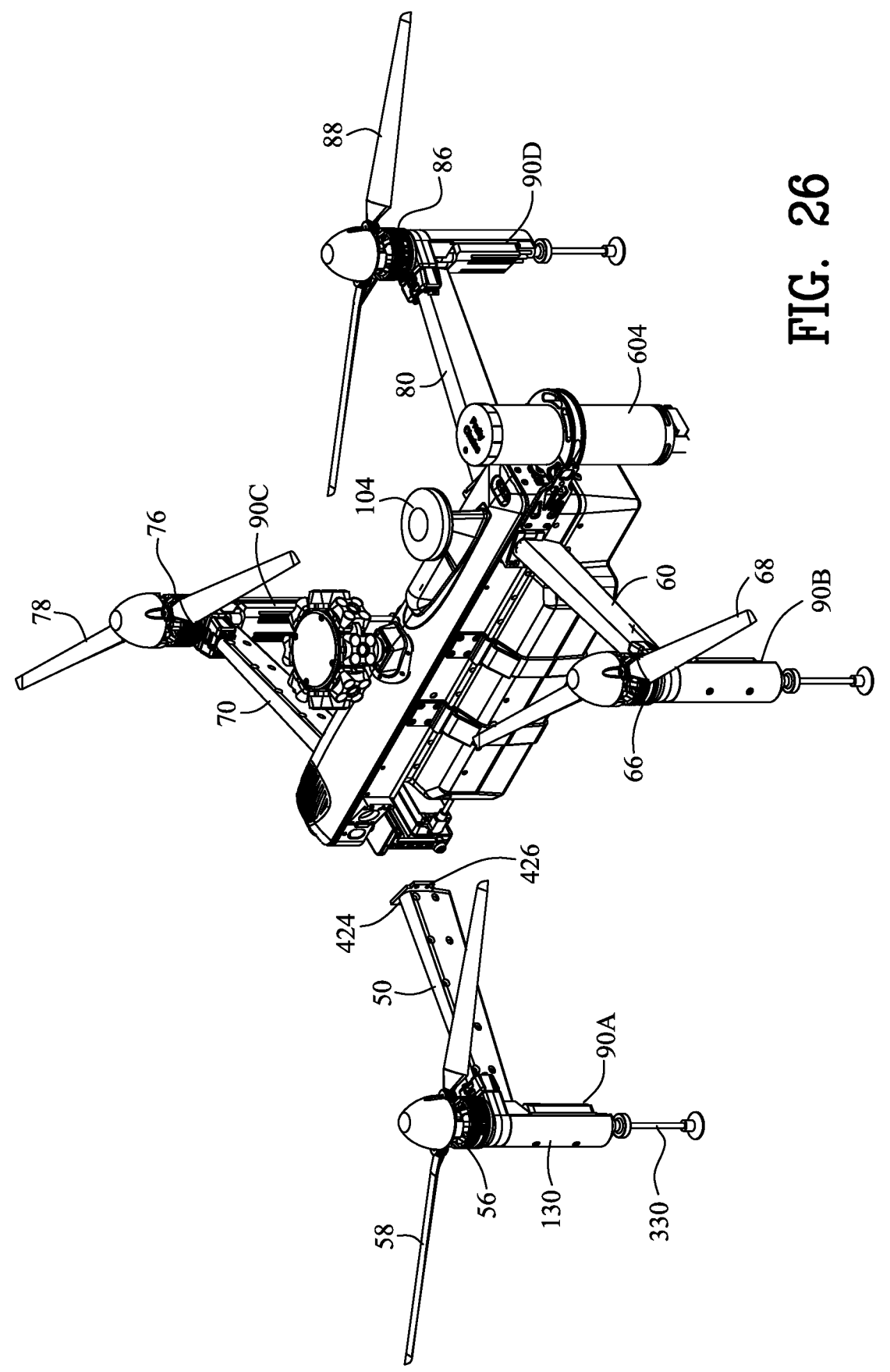
FIG. 26 is an upper rear isometric view of FIG. 1 illustrating the boom removed from a fuselage.
Figure 27:
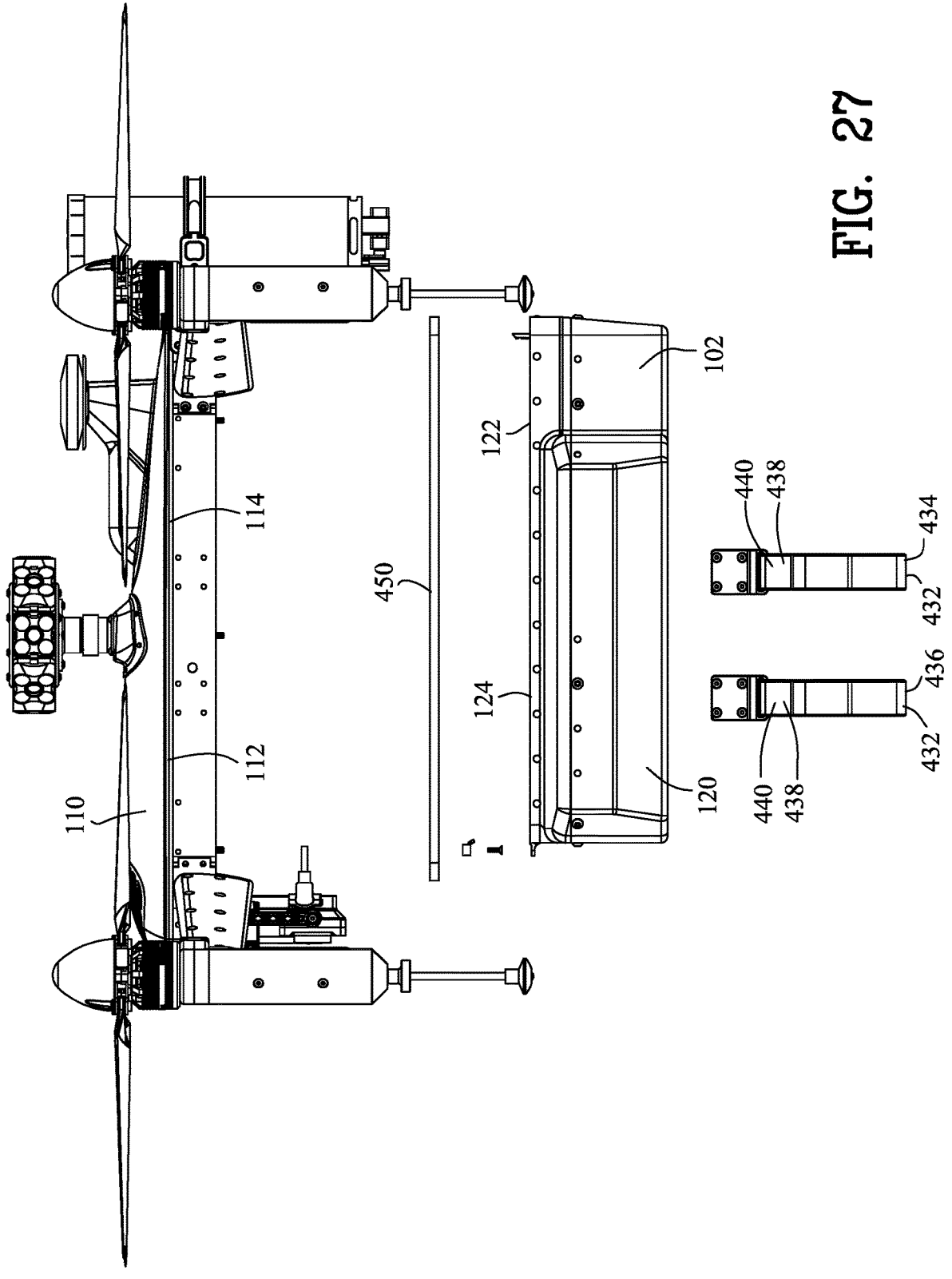
FIG. 27 is an exploded view of FIG. 10.
Figure 28:
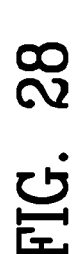
FIG. 28 is a top isometric view of a stiffing plate in FIG. 27.
Figures 29, 30, 31:
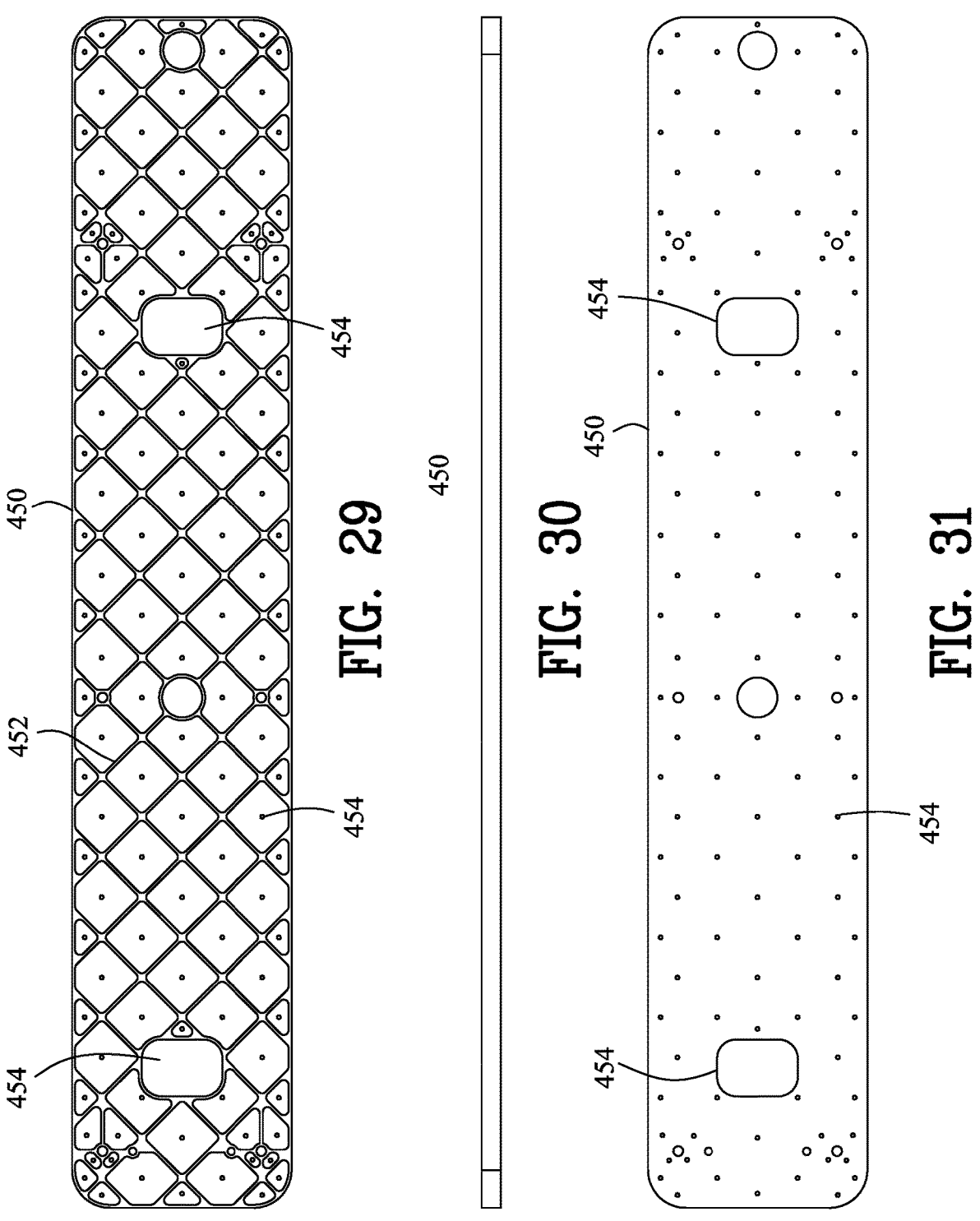
FIG. 29 is a top view of FIG. 28.
FIG. 30 is a front view of FIG. 29.
FIG. 31 is a bottom view of FIG. 29.
Figure 32:
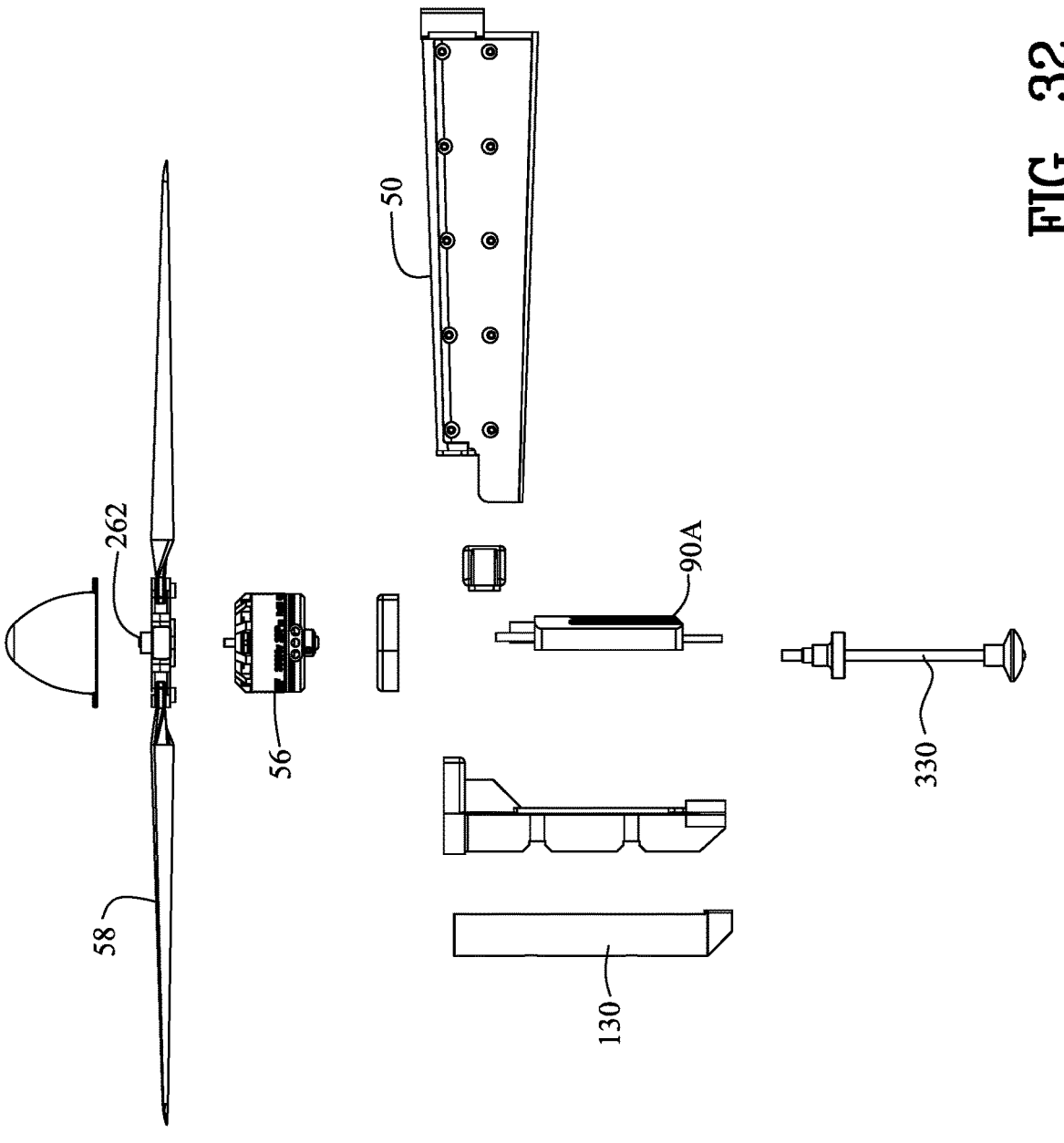
FIG. 32 is an exploded view of 11.
Figure 33:
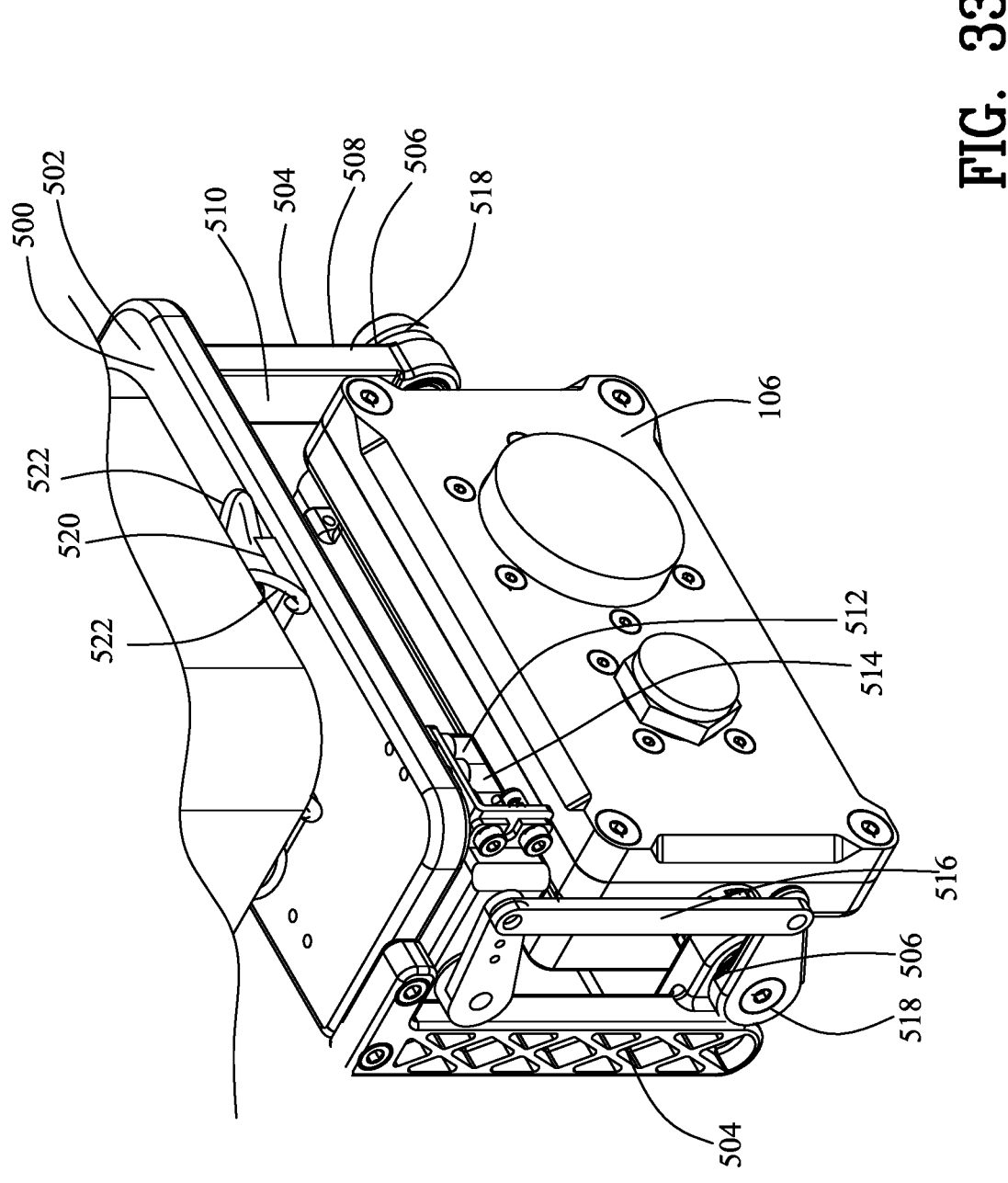
FIG. 33 is an enlarged portion of FIG. 1.
Figure 34:
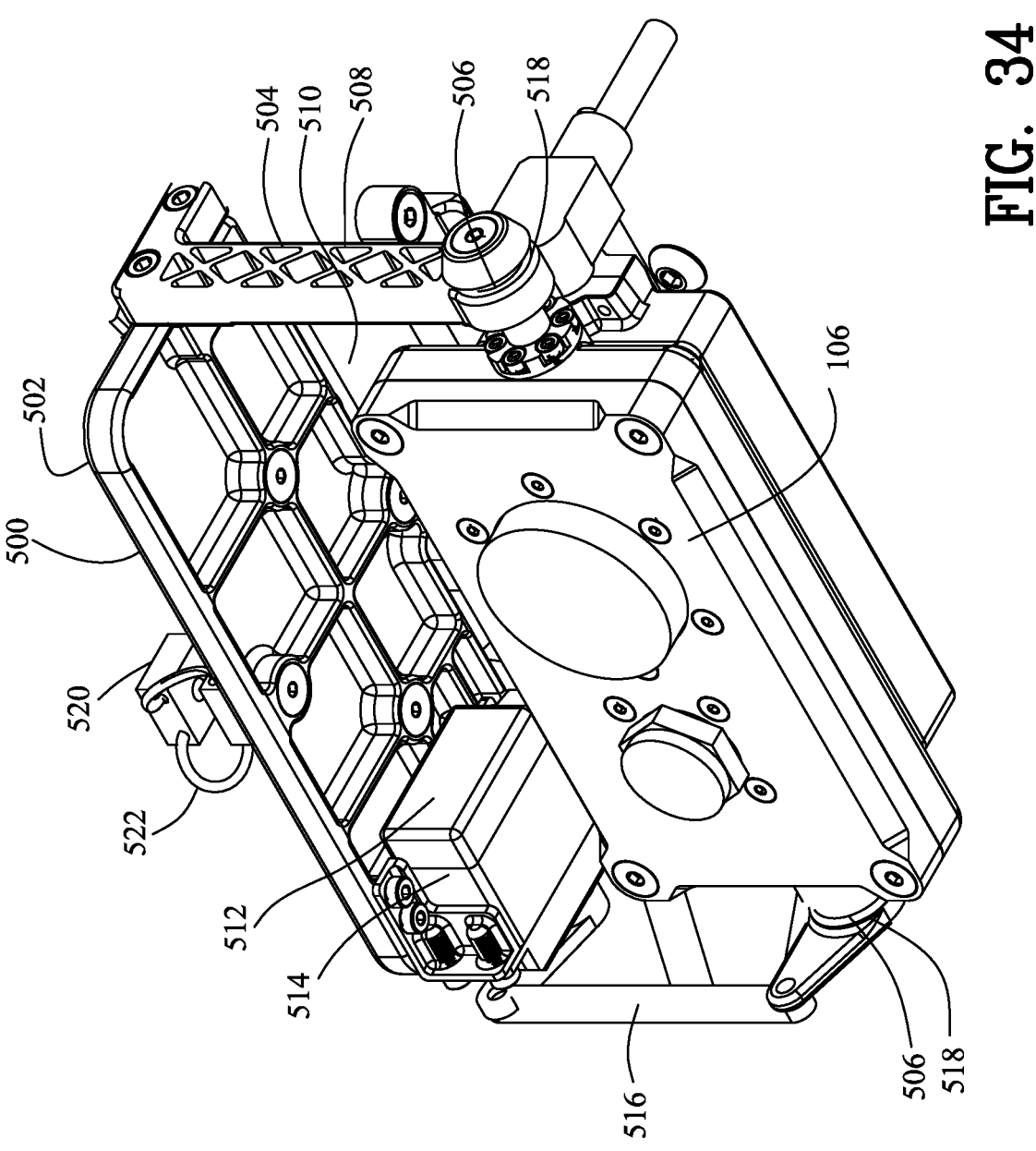
FIG. 34 is an enlarged portion of FIG. 4.

FIGS. 1-34 illustrate an unmanned aerial vehicle 10 comprises a fuselage 20 defining a front wall 22, a primary side wall 24, a secondary side wall 26 and a rear wall 28. A fuselage chamber 30 is defined within the fuselage 20. An upper fuselage perimeter edge 32 is defined by the front wall 22, the primary side wall 24, the secondary side wall 26 and the rear wall 28. An upper aperture 34 is defined by the upper perimeter edge 32. A lower fuselage perimeter edge 36 is defined by the front wall 22, the primary side wall 24, the secondary side wall 26 and the rear wall 28. A lower aperture 38 is defined by the lower perimeter edge 36. Preferably, the fuselage 20 is constructed from an elongated flat plate configuration forming a rectangle body. One or more cross members may extend and be coupled to the interior of the rectangle body. The fuselage 20 may be constructed of a metallic, carbon fiber, polymeric or other materials.

An upper cap 110 defines an upper cap perimeter edge 112. The upper cap perimeter edge 112 abuts the upper fuselage perimeter edge 32 for coupling the upper cap 110 within the fuselage 20 and may define an upper seal 114. The upper cap 110 may be configured for storing the antenna 104. In addition, the upper cap 110 may include an antenna body for housing the antenna 104 within. The upper cap 110 may be constructed of a metallic, carbon fiber, polymeric or other materials. Furthermore, the upper cap 110 may be constructed of a discontinuous carbon fiber, dyneema fiber, innegra fiber, core glass fabric or other composite material.

A lower cap 120 defines a lower cap perimeter edge 122. The lower cap perimeter edge 122 abuts the lower fuselage perimeter edge 36 for coupling the lower cap 120 within the fuselage 20 and may define a lower seal 124. The lower cap 120 may be configured for storing the battery 102. The lower cap 120 may further receive a camera 106. The lower cap 120 may be constructed of a metallic, carbon fiber, polymeric or other materials. Furthermore, the lower cap 120 may be constructed of a discontinuous carbon fiber, dyneema fiber, innegra fiber, core glass fabric or other composite material.

A first boom 50 extends between a proximal end 52 and a distal end 54. The proximal end 52 of the first boom 50 is coupled to the primary side wall 24. A first rotor lift assembly 56 is coupled to the distal end 54 of the first boom 50 for providing a first lifting force 58. A second boom 60 extends between a proximal end 62 and a distal end 64. The proximal end 62 of the second boom 60 is coupled to the primary side wall 24. A second rotor lift assembly 66 is coupled to the distal end 64 of the second boom 60 for providing a second lifting force 68. A third boom 70 extends between a proximal end 72 and a distal end 74. The proximal end 72 of the third boom 70 is coupled to the secondary side wall 26. A third rotor lift assembly 76 is coupled to the distal end 74 of the third boom 70 for providing a third lifting force 78. A fourth boom 80 extends between a proximal end 82 and a distal end 84. The proximal end 82 of the fourth boom 80 is coupled to the secondary side wall 26. A fourth rotor lift assembly 86 is coupled to the distal end 84 of the fourth boom 80 for providing a fourth lifting force 88.

The first rotor lift 56 includes a first motor 150 and a first propeller 160. A first propeller connector 170 removeably couples the first propeller 160 to the first motor 150. The first propeller connector 170 includes a first keyed post 180 coupled to the first motor 150 and a first keyed receiver 190 is coupled to the first propeller 160. A first actuator 200 is slidably coupled to the first keyed receiver 190 and abuts the first keyed post 180 for maintaining the first keyed post 180 engaged within the first keyed receiver 190 and the first actuator 200 is depressed for distancing the first actuator 200 from the first keyed post 180 for releasing the first keyed post 180 from the first keyed receiver 190.

The second rotor lift 66 includes a second motor 152 and a second propeller 162. A second propeller connector 172 removeably couples the second propeller 162 to a second motor 152. The second propeller connector 172 includes a second keyed post 182 coupled to the second motor 152 and a second keyed receiver 192 coupled to second propeller 162. A second actuator 202 is slidably coupled to the second keyed receiver 192 and abuts the second keyed post 182 for maintaining the second keyed post 182 engaged within the second keyed receiver 192 and the second actuator 202 is depressed for distancing the second actuator 202 from the second keyed post 182 for releasing the second keyed post 182 from the second keyed receiver 192.

The third rotor lift 76 includes a third motor 154 and a third propeller 164. A third propeller connector 174 remove-ably couples the third propeller 164 to the third motor 154. The third propeller connector 174 includes a third keyed post 184 coupled to the third motor 154 and a third keyed receiver 194 coupled to the third propeller 164. A third actuator 204 is slidably coupled to the third keyed receiver 194 and abuts the third keyed post 184 for maintaining the third keyed post 184 engaged within the third keyed receiver 194 and the third actuator 204 is depressed for distancing the third actuator 204 from the third keyed post 184 for releasing the third keyed post 184 from the third keyed receiver 194.

The fourth rotor lift 86 includes a fourth motor 156 and a fourth propeller 166. A fourth propeller connector 176 removeably couples the fourth propeller 166 to fourth first motor 156. The fourth propeller connector 176 includes a fourth keyed post 186 coupled to the fourth motor 156 and a fourth keyed receiver 196 coupled to fourth first propeller 166. A fourth actuator 206 is slidably coupled to the fourth keyed receiver 196 and abuts the fourth keyed post 186 for maintaining the fourth keyed post 186 engaged within the fourth keyed receiver 196 and the fourth actuator 206 is depressed for distancing the fourth actuator 206 from the fourth keyed post 186 for releasing the fourth keyed post 186 from the fourth keyed receiver 196.

The first, second, third and fourth propeller connector 170, 172, 174, 176 permit an expedited removal and instal-lation of the first, second, third, and fourth propellers 160, 162, 164 and 166. Furthermore, the first, second, third and fourth propeller connector 170, 172, 174, 176 to not require any tools or other instruments in the removal or installation process. In addition the first, second, third and fourth pro-peller connector 170, 172, 174, 176 may not be activated inadvertently serving as a safety mechanism in their removal and installation. The first, second, third and fourth propeller connector 170, 172, 174, 176 may be utilized to replace a broken propeller, to reduce the overall volume of the unmanned aerial vehicle 10 for ease of transportation or storage or to alter the size or pitch of the propellers 160, 162, 164, 166.

The first keyed post 180, the second keyed post 182, the third keyed post 184 and the fourth keyed post 186 include a keyed head 220 coupled to a post base 222 by a post undercut 224. The first keyed receiver 190, the second keyed receiver 192, the third keyed receiver 194 and the fourth keyed receiver 196 include a keyed channel 230.

The first actuator 200, the second actuator 202, the third actuator 204 and the fourth actuator 206 include a capture body 240. The first, second, third and fourth keyed head 220 engage the first, second, third and fourth keyed channel 230 respectively for terminating a rotational displacement of the first, second, third and fourth keyed receiver 190, 192, 194, 196 relative to the first, second, third and fourth keyed post 180, 182, 184, 186. The first, second, third and fourth capture body 240 abut the first, second, third and fourth post undercut 224 respectively for preventing disengagement of the first, second, third and fourth keyed receiver 190, 192, 194, 196 relative to the first, second, third and fourth keyed post 180, 182, 184, 186. The first, second, third and fourth capture body 240 withdraw from the first, second, third and fourth post undercut 224 respectively for permitting disengagement of the first, second, third and fourth keyed receiver 190, 192, 194, 196 from the first, second, third and fourth keyed post 180, 182, 184, 186.

The keyed head 220 may include a hexagon body 226 and the post undercut may include a cylindrical body 228. The keyed channel 230 may include a hexagon channel 232. Alternatively, the keyed head 220 and the keyed channel 230 may include other geometric shapes such as triangular, square, rectangle, trapezoid, star, pentagon, elliptical or other shapes.

The first, second, third and fourth capture body 240 abut the first, second, third and fourth post undercut 224 respectively for defining a lower rotational post guide 260 during rotation of the first keyed receiver 190, the second keyed receiver 192, the third keyed receiver 194 and the fourth keyed receiver 196 relative to the first keyed post 180, the second keyed post 182, the third keyed post 184 and the fourth keyed post 186 respectively.

A protrusion 250 is coupled to the first keyed post 180, the second keyed post 182, the third keyed post 184 and the fourth keyed post 186. The protrusion 250 is concentric to the first keyed post 180, the second keyed post 182, the third keyed post 184 and the fourth keyed post 186. A protrusion receiver 252 is coupled to the first keyed receiver 190, the second keyed receiver 192, the third keyed receiver 194 and the fourth keyed receiver 196. The protrusion receiver 252 is concentric to the first keyed receiver 190, the second keyed receiver 192, the third keyed receiver 194 and the fourth keyed receiver 196. The protrusion 250 of the first keyed post 180, the second keyed post 182, the third keyed post 184 and the fourth keyed post 186 engage with the protrusion receiver 252 of the first keyed receiver 190, the second keyed receiver 192, the third keyed receiver 194 and the fourth keyed receiver 196 respectively for defining an upper rotational post guide 262 during rotation of the first keyed receiver 190, the second keyed receiver 192, the third keyed receiver 194 and the fourth keyed receiver 196 relative to the first keyed post 180, the second keyed post 182, the third keyed post 184 and the fourth keyed post 186 respectively.

The first, second, third and fourth actuators 200, 202, 204, 206 may include a primary actuator 210 and a secondary actuator 212. The primary actuator 210 includes a primary capture body 242 and the secondary actuator 212 includes a secondary capture body 244. The primary actuator 210 and the secondary actuator 212 slidably diverge relative to the first, second, third and fourth keyed receiver 190, 192, 194, 196 for converging the primary capture body 242 and the secondary capture body 244 into abutment with the first, second, third and fourth keyed post 180, 182, 184, 186. The primary actuator 210 and the secondary actuator 212 slidably converge relative to the first, second, third and fourth keyed receiver 190, 192, 194, 196 for diverging the primary capture body 242 and the secondary capture body 244 and distancing primary capture body 242 and the secondary capture body 244 from the first, second, third and fourth keyed post 180, 182, 184, 186.

The first, second, third and fourth keyed receiver 190, 192, 194, 196 may include an upper keyed receiver plate 270 and a lower keyed receiver plate 272. A primary guide wall 274 and a secondary guide wall 276 are positioned between the upper keyed receiver plate 270 and the lower keyed receiver plate 272 for defining an actuator channel 278. The first, second, third and fourth actuator 200, 202, 204, 206 are slidably displaced within the actuator channel 278 in the first, second, third and fourth keyed receiver 190, 192, 194, 196 respectively.

The upper keyed receiver plate 270 includes a first upper tab 280 and a second upper tab 282. The lower keyed receiver plate 272 includes a first lower tab 290 and a second lower tab 292. The first upper tab 280 and the first lower tab 290 define a first propeller channel 284 for receiving a first single propeller blade 168A. The second upper tab 282 and the second lower tab 292 define a second propeller channel 294 for receiving a second single propeller blade 168B. The first propeller channel 284 permits the first single propeller blade 168A to pivot relative to the keyed receiver 190, 192, 194, 196 in a non-operational condition. Similarly, the second propeller channel 294 permits the second single propeller blade 168B to pivot relative to the keyed receiver 190, 192, 194, 196 in a non-operational condition. Upon an operational condition the centrifugal force causes the first single propeller blade 168A and the second single propeller blade 168B to extend laterally from the keyed receiver 190, 192, 194, 196. By permitting the pivoting of the first single propeller blade 168A and the second single propeller blade 168B allows for easily storage and transportation.

A bias element 300 is coupled to the first, second, third and fourth actuator 200, 202, 204, 206 for maintaining and compressing the first, second, third and fourth actuator 200, 202, 204, 206 against the first, second, third and fourth keyed post 180, 182, 184, 186 respectively. The bias element 300 may include a spring 302, hydraulic bias device, elastic device, or other bias devices.

An electronic controller system 90 operates the first motor, second motor, third motor and fourth motor 150, 152, 154, 156. A first electrical conduit 92 transverses within the first boom 50 and electrically couples the electronic controller system 90 to the first motor 150. A second electrical conduit 94 transverses within the second boom 60 and electrically couples the electronic controller system 90 to the second motor 152. A third electrical conduit 96 transverses within the third boom 70 and electrically couples the electronic controller system 90 to the third motor 154. A fourth electrical conduit 98 transverses within the fourth boom 80 and electrically couples the electronic controller system 90 to the fourth motor 156.

The first, second, third and fourth rotor lift assemblies 56, 66, 76, 86 may include a notched mounting member 310. The electronic controller system 90 may a first, second, third and fourth electronic controller systems 90A, 90B, 90C, 90D coupled in the notched mounting member 310 of the first, second, third and fourth rotor lift assemblies 56, 66, 76, 86 respectively for exposing the first, second, third and fourth electronic controller systems 90A, 908, 90C, 90D and cooling the first, second, third and fourth electronic controller systems 90A, 90B, 90C, 90D and providing improved aerodynamics.

The first, second, third and fourth rotor lift assemblies 56, 66, 76, 86 may further include a rotor lift access plate 130. The rotor lift access plate 130 provides access to the interior of the first, second, third and fourth rotor lift assemblies 56, 66, 76, 86, to the bottom of the first, second, third and fourth motor's 150, 152, 154, 156 and improves aerodynamics of the unmanned aerial vehicle 10.

The first, second, third and fourth rotor lift assembly 56, 66, 76, 86 extend from an upper end 320 and a lower end 322. The lower end 322 of the first, second, third and fourth rotor lift assembly 56, 66, 76, 86 including a rotor couple 324. A support 330 extends from an upper end 334 and a lower end 336. The upper end 334 of the support 330 includes a support couple 338. The support couple 338 engages with the rotor couple 324 for defining a removable support lock 350. The support 330 defines a leg 332 that supports the unmanned aerial vehicle 10 upon landing on a surface. The support 330 may include a rod 340 for permitting lateral displacement between the upper end 334 and the lower end 336 of the support 330 and defining a lateral force absorbing device 352 in the first, second, third and fourth rotor lift assembly 56, 66, 76, 86. More specifically, the rod 340 may be constructed of a fiberglass rod 342 that may be easily altered in height depending upon the clearance required between the unmanned aerial vehicle 10 and the supporting surface. The fiberglass rod 342 provides the lateral displacement for defining the lateral force absorbing device 352 and preventing a vertical compression of the support 330. The rotor couple 324 may include a threaded bore 326. The support couple 338 may include a threaded rod 344. The threaded rod 344 threadably engages the threaded bore 326 for defining the removable support lock 350.

A handling frame 360 may be coupled to the threaded rod 344 for applying a rotational force to the threaded rod 344 and facilitating threadably engaging the threaded rod 344 into the threaded bore 326. The handling frame 360 may include a knurled knob 362 having an increased diameter for a frictional cribbing of the handling frame 360 and permitting an increased rotational force upon the rod 340.

A foot member 364 may be coupled to the lower end 336 of the support 330 for increasing the contact surface area of the lower end 336 of the support 330 with a support surface. Furthermore, the foot member 364 may include a skid body 366 for permitting sliding of the support 330 upon landing.

The first, second, third and fourth booms 50, 60, 70, 80 may define a reduced height 380, a reduced width 382 and a reduced depth 384 from the proximal end 52, 54, 72, 82 to the distal end 54, 64, 74, 84 for defining a tapered height boom 390, a tapered width boom 392 and a tapered depth boom 394 respectively and reducing weight of the booms 50, 60, 70, 80, reducing surface area of the booms 50, 60, 70, 80 and improving aerodynamics. The first, second, third and fourth booms 50, 60, 70, 80 may define a symmetrical teardrop cross section 400. Alternatively, the first, second, third and fourth booms 50, 60, 70, 80 may define an asymmetrical teardrop cross section 402 for improving aerodynamic performance during angular flight.

The first, second, third and fourth booms 50, 60, 70, 80 may include an interior elongated channel 410 extending from the proximal end 52, 54, 72, 82 to the distal end 54, 64, 74, 84. An elongated notch 412 extends from the proximal end 52, 54, 72, 82 to the distal end 54, 64, 74, 84 in the first, second, third and fourth booms 50, 60, 70, 80 for exposing the interior elongated channel 410. A boom cover plate 414 engages adjacent to the elongated notch 412 for covering the interior elongated channel 410. The interior elongated channel 410 receive the first electrical conduit 92, the second electrical conduit 94, the third electrical conduit 96 and the fourth electrical conduit 98. The boom cover plate 414 permits access into the interior elongated channel 410 such that the electrical conduit may be repaired or replaced if needed.

The unmanned aerial vehicle 10 may further include an angular keyed boom lock 420 removeably coupling the first, second, third and fourth booms 50, 60, 70, 80 to the fuselage 20. The angular keyed boom lock 420 positions the first, second, third and fourth rotor lift assembly 56, 66, 76, 86 in a non-perpendicular orientation 422 for permitting increased sized first, second, third and fourth rotor lift assembly 56, 66, 76, 86 and increased sized first, second, third and fourth propeller 160, 162, 164 and 166. The angular keyed boom lock 420 may include a tab and groove primary lock 424 that pivotably engage relative to the fuselage 20 and a quick release fastener lock 426 that fastens to the fuselage 20. The angular keyed boom locks 420 preferably include an boom lock aperture for permitting the first, second, third and fourth electrical conduit 92, 94, 96, 98 to traverse from the fuselage chamber 30 to the first, second, third and fourth booms 50, 60, 70 and 80.

A battery pack 430 containing a battery 102 is coupled to the fuselage for providing an electrical current to an electrical circuit 100, the electronic controller system 90 and the first, second, third and fourth motors 150, 152, 154, 156. A clip system may be utilized for coupling the battery pack for 30 to the fuselage 20. Alternatively or in addition an adjustable tether 432 is coupled to the fuselage 20 and encircles the battery pack 430 for supporting and coupling the battery pack 430 to the fuselage 20. The adjustable tether 432 may include a primary tether 434 and a secondary tether 436. A tether length adjustment device 438 may be utilized for altering the length of the adjustable tether 432 such that the tether 432 is compressing upon the battery pack 430. The tether length adjustment device 438 may include but not limited to a strap slipknot, a strap lock, strap ratchet, elastic strap or other devices. The adjustable tether 432 maybe coupled to the fuselage 20 by tether coupling ends 440 such as magnetic plates, snap fasteners, clips or other coupling devices.

A stiffing plate 450 may be is coupled to the fuselage 20 for preventing deflection of the fuselage 20. More specifically, the stiffening plate 450 may be positioned between the fuselage 20 and the battery pack 430. The stiffening plate 450 may include reinforcing ribs 452 that further stiffen the plate 450. The stiffening plate 450 may further include one or more stiffening plate apertures 4544 permitting access into the fuselage chamber 30, provide ventilation and reduce weight.

The first, second, third, and fourth propeller connector 170, 172, 174 and 176 may be utilized in other applications including but not limited to coupling water propellers, wenches, or other mechanical rotating objects wherein the subject invention can be described as a lock mechanism for removeably coupling a first object with a second object. The lock mechanism would include similar structure as described above including a keyed post coupled to the first object. A keyed receiver is coupled to the second object. An actuator is slidably coupled to the keyed receiver and abuts the keyed post for maintaining the keyed post engaged within the keyed receiver and the actuator is depressed for distancing the actuator from the keyed post for releasing the keyed post from the keyed receiver.

The keyed post includes a keyed head coupled to a post base by a post undercut. The keyed receiver includes a keyed channel. The actuator includes a capture body. The keyed head engages the keyed channel for terminating a rotational displacement of the keyed receiver relative to the keyed post. The capture body abuts the post undercut for preventing disengagement of the keyed receiver relative to the keyed post. The capture body withdraws from the post undercut for permitting disengagement of the keyed receiver from the keyed post.

A protrusion is coupled to the keyed post. The protrusion is concentric to the keyed post. A protrusion receiver is coupled to the keyed receiver. The protrusion receiver is concentric to the keyed receiver. The protrusion of the keyed post engages with the protrusion receiver of the keyed receiver for defining an upper rotational post guide during rotation of the keyed receiver relative to the keyed post.

The unmanned aerial vehicle 10 may further include a camera mount 500 having an upper mounting frame 502 and a lower mounting frame 504. A pivot 506 pivotably couples the camera 106 relative to the camera mount 500. The upper mounting frame 502 and the lower mounting frame 504 define a general U shaped frame 508 for defining a frame channel 510. The upper mounting frame 502 is coupled to the fuselage 20 by vibration isolators 520. The camera 106 is mounted to the lower mounting frame 544. A pivot actuator 512 is secured to the upper mounting frame 504 and is linked to the lower mounting frame 504 by an actuator arm 516. The pivot actuator 512 rotates the camera 106 about the pivot 506 for producing a rotational displacement 518 and adjusting the angular orientation of the camera 106. The pivot actuator 512 may include a servo 514.

One or more vibration isolators 520 may include wire rope isolators 522 used for coupling the upper mounting frame 502 to the fuselage 20. The one or more wire rope isolators 522 assist in minimizing vibration from the fuselage 20 being transferred to the camera mount 500 and into the camera 106. As such the one or more wire rope isolators 522 improves the video image produced by the camera 106. Alternatively, other vibration of medication devices may be used between the camera mount 500 and the fuselage 20.

The camera mount 500 may include a single-axis gimbal with servo-driven bar linkage and cable shock absorption system for thermal imaging and camera systems. The gimbal system is designed to rotate a device, such as a thermal imaging or camera system, in a single axis.

Traditional gimbal systems employ multi-axis rotation capabilities. While effective, they can be complex and costly to implement and maintain. There exists a need for a simplified, efficient, and resilient gimbal system optimized for single-axis rotation of imaging devices.

The present camera mount 500 provides a unique single-axis gimbal system that uses a servo with a bar type linkage. This allows the gimbal to effectively rotate a thermal imaging or camera system in one axis. Additionally, to counteract external forces, vibrations, and shocks which can distort the image quality, the system is suspended on a special vibration and shock dampening mechanism. This mechanism leverages cable type shock absorbers, ensuring smooth operation and optimal imaging results.

The servo with bar type linkage includes a gimbal system that includes a servo motor that rotates the device in a single axis. This servo motor is connected to the device using a bar-type linkage. This design ensures that the device remains at a fixed distance from the rotational axis and provides consistent and smooth rotation. The cable type shock absorbers surround the gimbal system including a series of cable-type shock absorbers. These cables are strategically positioned to absorb and dissipate both vibration and shock. The cables are elastic and can stretch and contract, allowing them to effectively dampen external disturbances. Integration with imaging systems provides the gimbal designed to accommodate a device such as a thermal imaging system or a camera system. The connection points are modular, allowing for various devices to be attached with ease. The single-axis rotation capability is particularly advantageous for scenarios where only one plane of motion is needed, simplifying the design, and reducing costs.

The advantages of the camera mount 500 include the single-axis gimbal system offering multiple advantages. It provides a simplified stabilization solution for imaging devices without compromising on resilience or functionality. The cable-type shock absorbers ensure that disturbances are minimized, resulting in clearer and more consistent images. The camera mount 500 is modular and scalable, making it suitable for a wide range of applications in various environments. By implementing this unique design, the present invention offers a cost-effective, efficient, and resilient solution to single-axis stabilization needs in the field of thermal imaging and camera systems.

As previously discussed the first, second, third, and fourth propeller connector 170, 172, 174 and 176 may be utilized in other applications and can be described as a lock mechanism for removeably coupling a first object with a second object. This iteration features a new click-lock, 2-3 second, push button rotor and optional spinner release mechanism. This is a new way to lock the rotors to the motor bell or can and takes the rotor out of shear by using a hexagon, octagon, triangular or splined hub adapter to configure almost any motor for our click-locking feature. This makes removal and replacement of rotors, propellers, impellors or even wheels easy to replace in seconds. This design is in no way limited to VTOL sUAS/drone systems. It can be adapted to drive shafts, e-surfboards, e-foil boards, boats, UUV's, cars, mowers, weed whackers and anything with a spinning or even non-spinning mass. It can be applied to fishing products and even mounts for computers, fish-finders, fishing rods and more. An additional variation would be to make an asymmetrical version using only one push button and a counterbalance. This solution would simplify the assembly cutting down on the parts count however, it would lack the safety of to equally opposing buttons that act in unison and equally and opposite one another. Currently as shown, a right button disengages the undercut of the hexagonal nipple on the left. Conversely the button on the left disengages the undercut on the right (as shown). This product is in no way limited only to this aircraft and is a product in onto, itself that can be used to quickly orient and attach almost anything to something else. It is also completely scalable.

The gimbal camera/sensor mount is smaller and more compact they end the previous model. This model features a single, internal PCB with both a thermal and daytime camera/sensor affixed and electrically joined together. This allows the sensors to be operated individually showing either a daytime camera, thermal image or even multiplexed, whereby, showing both images combined. The new gimbal/sensor-head, features static-cable isolators affixed to a motorized base plate. This sub-assembly supports either a servo or stepper motor configuration.

The new sensor-head is designed to be more waterproof and compact. This sensor head is made using a clamshell design, CNC-machined from aluminum and having internally placed compression rings made of aluminum that squeeze O-rings surrounding the sensor lenses as the radial arrangement of screws are tightened.

The fuselage is comprised from CNC machined aluminum and is in no way limited to this material this chassis can be made using injection molded polymers, it could be compression molded from carbon fiber or even from another, hybrid composite materials. A new fuselage features battery hanger's, to support strapping of conventional low-cost batteries in addition to optionally supporting it's modular payload and battery housing.

The subject invention also features a nearly identical, but more robust click-lock button release mechanism for releasing the upper fuselage cover and the lower battery housing. The buttons were made significantly larger in diameter to improve ergonomics by increasing the surface area.

The subject invention also features a curved boom assembly. This simple curve in the boom provides an alternative way to spread the rotors apart from one-another so the fuselage can remain as small and light as possible. This allows the drone to support the largest possible rotors for added lift and efficiency.

The curved booms are also split horizontally or even vertically making it significantly easier to string wires from the motors to the fuselage. It also allows for the booms to be manufactured in a more complex shape such as a crescent on top and by adding a foil to the bottom into an airfoil. This is the lowest drag coefficient shape possible and not only improves energy efficiency but also reduces, noise, turbulence and buffeting or resonant frequency. Certain resonance can cause screws to loosen, attenuation in the frame can cause instability in flight and even affect the gyros and image quality. The manufacturing of these newly envisioned, split booms and foils can be CNC machined as shown, molded using composites or injection molded plastics or even hybrid molded using composite tape laying techniques. It is in no way only limited to these techniques. Many of these methods can help to reduce weight and improve longitudinal rigidity and moment arm torsional instability.

The distal end of each of the booms, feature a motor mount top and a nacelle frame for an ESC speed controller on the bottom. This novel sub-assembly even features a threaded bottom for a titanium, fiberglass and aluminum skid/shaft, designed to absorb hard landings. Also, by being at the distal end of each boom, the subject invention has a much wider stance making landings easier, whereby, reducing the risk of a rotor strike significantly. The thread-in skid may become a gas-strut, fluid filled shock absorber, or another form of an animated sub-assembly to actively reduce the shock pulse on impact with the ground during hard landings.

This motor/ESC nacelle assembly also has integrated cable guides, counter-bored areas for components such as the bottom of the ESC and mounting threads for an aerodynamic cover to keep wires out of the propwash, reducing drag and minimizing exposure to the elements.

The subject invention also features a wide array of sensors not limited to cameras and may include a lidar system, either open or closed array, spinning or not, proximity sensors, IR, ultrasonic, laser or alike.

The booms are envisioned to be optionally transitional, rotating from vertical to horizontal in some capacity, whereby allowing the subject invention to transition from vertical takeoff to forward flight generating some forward lift, while reducing its energy burn. The foils may become longer and sleeker as time goes on and feature flaps, flaperons, ailerons or alike to control its flight characteristics and allow it to fly at higher speeds more efficiently. It's envisioned that the foils may become self-morphing such that the typical moving parts of a hinged aileron is no longer required in order to shape change the foil.

The subject invention is intended to be a universal platform for VTOL applications of all sorts. It's in no way limited to its current size. It's designed to be completely scalable and support multi-mission payloads. It is essentially payload agnostic and its long rectangular airframe with the heavy stuff on the bottom gives it inherent, pendulum effect during flight. This means it naturally wants to right itself like a high-wing aircraft on a proper glideslope. Its flight characteristics are intuitive. Its easy for customers to add their own payloads. The subject invention can support a picatinny or alike rail system, allowing the pilot to adjust the Cg over its entire length.

The battery housing can hold more than just a battery. It has space for charging, carrier boards, miscellaneous customer defined payloads and can support 18650 or alike cell packs and Lithium-Ion batteries within its protective casing. It's designed to be modular and serviceable and keep all electronics housed inside out of the elements by featuring a contiguous gasket.

The subject invention is in no way limited to is current materials and can be fabricated using a wide range of advanced composites, metals and processes. Any one of the features described can be used in unison or individually and none are limited to use in only drones or sUAS systems.

Landing gear—new knurled design allows for easier dis-assembly without use of any tools. Heat sink—new aluminum finned heat sink incorporated into the top cover allows for heat dissipation. Click lock prop—allows for quick and easy dis-assembly that does not require any tools. Foil boom arm—more aerodynamic and hides/protects power wires.

Gimbal—Camera: 20-Boson 320, 13.8 mm-f1.0, 16 deg HFoV 9 Hz with Visible Sensor on DS-IR Dual Case RevB from OEM Cameras Custom Enclosure and Gimbal System:

CNC Machined Custom Aluminum Housing, Anodized to prevent Short Circuit potential.

O-rings on each camera lens, main bezel to housing and HDMI Port.

Heat Sink Removed from Dual Camera Board, Used Thermal Gap Pad under light compression to connect camera board to housing and dissipate heat.

Titanium Shafts Mounted to Housing for Bearing Support in connection to Gimbal System.

CNC Machined Anodized Aluminum Gimbal Mechanism.

Motor downsized to MKS DS90 to reduce weight, driving similar linkage system.

Keyed separate bottom linkage arm onto Titanium Shaft, rather than arm being part of lower platform.

Side Mounted to Camera Housing, Lower Platform from previous housing removed.

Dual Arm Support for housing to prevent Cantilevered Stress, Both Arms utilize two ball bearings.

Top Plate Sectionalized into arms and top platform rather than L-Shaped Platform directly attached to drone (with vibration isolators).

Spring loaded actuating device that utilizes 1 or 2 locking slides which engage into a slot, a tang or a post when it is assembled. Two button slides provide equal and opposite engagement and disengagement from the striker/tang. In some instances, two buttons are required for safety so that a deliberate squeeze is required for disengagement and removal. In other instances, only one button may be required where safety is not a concern or the device being secured is not critical in nature. In such instances if the item being secured is for example, a propeller or where balance is a requirement, then a counter balance will be required. The user will then press on the button slides to disengage the locking mechanism from the slot to disassemble it.

The shape of the post or tang will determine how it is secured when locked/engaged by way of its undercut. The post or tang can be round for a shaft mount of a propeller having a keyed locking feature or slot. It can be rectangle for indexing into 2 positions. Can be square for indexing into 4 positions. Can be a pentagonal, hexagonal, octagonal etc. for more mounting positions.

The post can also be splined or have a "gear tooth" design for the maximum amount of index mounting locations for orienting. The post and slides can be made with an angled lead-in that will actuate the slides out of the way before being pushed back into position by the springs for locating and securing and in some instances locking. This will facilitate faster connections than traditional mechanical fasteners such as nuts and bolts.

The click-lock can also have a spring loaded automatically engaging sliding or push button "safety" that will lock the slides into position when closed and keep them from releasing when being accidentally hi ton something, or potentially being jarred open from a drop. This locking "safety" mechanism will need to be disengaged by the user before the mechanism can be opened to release it from whatever it is locking onto.

Uses:

The click locking mechanism can be altered for a variety of use case scenarios including mounting fixed or folding rotors, propellers, impellors, turbines, nacelles, spinners, nosecones a to a motor or engine such as, one on a UAS/UAV.

Options Include and are not Limited to the Following:

Mounting propellers to the shaft of motor to propel a kayak, Surfboard, foil board, boat, paramotor-glider, erkano-plans or any marine related device that could have a motor with a shaft that spins an ancillary component. It can be used to secure a shroud, duct, blade protector or water/air directing tube to the outside of a motor. It can be used to assemble, disassemble or change out components of a drone by incorporating the design, accompanied with a quick disconnecting style of wiring harness into the construction of the body or fuselage.

It can be used a primary method of attachment for modular payloads, miscellaneous components, motor or engine mounting. It can be used to attach a flashlight, knife, grip accessory, sling mounting device or other tool to an accessory such as a Picatinny or Weaver mounting rail on a rifle, shotgun, handgun or similar weapon system. This will allow for fast and easy mounting or dismounting of a device or accessory.

It can be used to quickly change out wheels or trucks on a conventional or electric skateboard to calibrate the riding style or adapt to different types of terrain as needed.

The invention relates to the fastening of rotary props to a drone device. The rotor or propeller assembly comprises of 4 main components: the rotor or propeller spinner/cone, propeller blades, A click-locking mechanism, and a fixture hub. The propeller cone, blades, and locking mechanism are fastened together to form the main rotary assembly and is designed to quickly detach from the fixture hub that is permanently fastened to the drone body.

The click locking mechanism consists of 2 interlocking push tabs. These tabs are spring loaded and when both are subjected to compression, the locking channel located at the center of the Click Lock is extenuated, releasing the grip on the fixture hub and allows the propeller assembly to detach away. The push tabs are encased in 2 fixture plates which contain 4 fastener points to join the plates together and 2 fastener points to secure the propeller blades and the cone to the assembly.

The propeller cone is a single body mounted above the locking mechanism. The cone is fastened at 2 points that are extruded partially into the cylindrical base of the cone. The fixture hub is a 4 point fixture with a hexagonal pillar at its center. The Prop assembly is lowered into place and couples onto the hexagonal pillar. The click locking mechanism allows for better folding/stowing of rotor or propeller blades than earlier variations.

This design lends itself better to integration of electrical components such as dielectrically insulated 3/phase connections, pogo-pin assemblies, coax, cage-pins and many other types of connectors. This is in large part because of it more compact size. As a result of its smaller footprint and more strategic use of materials it's easier to reduce its size for smaller motors and engines that had been previously recognized in earlier embodiments.

This version can be used for kayak, paddleboard and other marine personal watercrafts or vessels to hold implements such as paddle holders, GPS mounts, cellular mounts, speakers, fish finders, fishing rod holders, auxiliary tender craft motor mount, trolling motors and alike. This design can be manufactured in lower profiles than the previous embodiments.

It lends itself to being utilized as a cell phone mount, tablet mount, computer mount, TV mount and more. This design can be utilized as an asymmetrical assembly requiring only one button for retention rather than a two button squeeze by turning the opposite side into a counterbalance something like a motor instead of having a second button. Alternatively, it can be omitted altogether if balanced weight distribution is not a requirement as it wouldn't be for a fishing-rod holder.

The unmanned aerial vehicle 10 may further include a container mount 600 for defining container channel 602. A container 604 is secured within the container channel 602 of the container mount 600 for coupling the container 604 to the fuselage 20. The container mount 600 may include mechanical fasteners for securing the container 604 to the fuselage 20. The container 604 may include a parachute for safely descending the unmanned aerial vehicle 10 if a malfunction occurs. Alternatively, the container 604 may utilized for housing tools, food, water, medicine, documents, electronic devices or other supplies needed.

An antenna may be coupled to the fuselage. An antenna twist lock connector couples the antenna with the fuselage. An antenna electrical pin and an antenna electrical socket are interior to the antenna twist lock connector for electrically coupling the antenna with the electronic controller system.

A sensor may be coupled to the fuselage. The sensor may include a 360 degree object avoidance sensor. The object avoidance sensor may include a closed array system or an open array system. More specifically the object avoidance sensor may include GPS navigation sensor, an infrared sensor, a microwave sensor, a lidar sensor, a ultrasonic sensor, a flow sensor or other navigation sensors. A sensor twist lock connector couples the sensor with the fuselage. A sensor electrical pin and a sensor electrical socket are interior to the sensor twist lock connector for electrically coupling the sensor with the electronic controller system.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An unmanned aerial vehicle, comprising:

a fuselage defining a fuselage chamber;

a first boom extending between a proximal end and a distal end;

said proximal end of said first boom coupled to said fuselage;

a first rotor lift assembly coupled to said distal end of said first boom for providing a first lifting force;

a second boom extending between a proximal end and a distal end;

said proximal end of said second boom coupled to said fuselage;

a second rotor lift assembly coupled to said distal end of said second boom for providing a second lifting force;

a third boom extending between a proximal end and a distal end;

said proximal end of said third boom coupled to said fuselage;

a third rotor lift assembly coupled to said distal end of said third boom for providing a third lifting force;

a fourth boom extending between a proximal end and a distal end;

said proximal end of said fourth boom coupled to said fuselage;

a fourth rotor lift assembly coupled to said distal end of said fourth boom for providing a fourth lifting force;

said first rotor lift including a first motor and a first propeller;

a first propeller connector removeably coupling said first propeller to said first motor;

said first propeller connector including a first keyed post coupled to said first motor and a first keyed receiver coupled to said first propeller;

a first actuator slidably coupled to said first keyed receiver and abutting said first keyed post for maintaining said first keyed post engaged within said first keyed receiver and said first actuator depressed for distancing said first actuator from said first keyed post for releasing said first keyed post from said first keyed receiver;

said second rotor lift including a second motor and a second propeller;

a second propeller connector removeably coupling said second propeller to said second motor;

said second propeller connector including a second keyed post coupled to said second motor and a second keyed receiver coupled to said second propeller;

a second actuator slidably coupled to said second keyed receiver and abutting said second keyed post for maintaining said second keyed post engaged within said second keyed receiver and said second actuator depressed for distancing said second actuator from said second keyed post for releasing said second keyed post from said second keyed receiver, said third rotor lift including a third motor and a third propeller;

a third propeller connector removeably coupling said third propeller to said third motor;

said third propeller connector including a third keyed post coupled to said third motor and a third keyed receiver coupled to said third propeller;

a third actuator slidably coupled to said third keyed receiver and abutting said third keyed post for maintaining said third keyed post engaged within said third keyed receiver and said third actuator depressed for distancing said third actuator from said third keyed post for releasing said third keyed post from said third keyed receiver;

said fourth rotor lift including a fourth motor and a fourth propeller;

a fourth propeller connector removeably coupling said fourth propeller to fourth first motor;

said fourth propeller connector including a fourth keyed post coupled to said fourth motor and a fourth keyed receiver coupled to fourth first propeller; and a fourth actuator slidably coupled to said fourth keyed receiver and abutting said fourth keyed post for maintaining said fourth keyed post engaged within said fourth keyed receiver and said fourth actuator depressed for distancing said fourth actuator from said fourth keyed post for releasing said fourth keyed post from said fourth keyed receiver.

2. The unmanned aerial vehicle as set forth in claim 1, wherein said first keyed post, said second keyed post, said third keyed post and said fourth keyed post including a keyed head coupled to a post base by a post undercut;

said first keyed receiver, said second keyed receiver, said third keyed receiver and said fourth keyed receiver including a keyed channel;

said first actuator, said second actuator, said third actuator and said fourth actuator including a capture body;

said first, second, third and fourth keyed head engaging said first, second, third and fourth keyed channel respectively for terminating a rotational displacement of said first, second, third and fourth keyed receiver relative to said first, second, third and fourth keyed post;

said first, second, third and fourth capture body abutting said first, second, third and fourth post undercut respectively for preventing disengagement of said first, second, third and fourth keyed receiver relative to said first, second, third and fourth keyed post; and said first, second, third and fourth capture body withdrawing from said first, second, third and fourth post undercut respectively for permitting disengagement of said first, second, third and fourth keyed receiver from said first, second, third and fourth keyed post.

3. The unmanned aerial vehicle as set forth in claim 2, wherein said keyed head includes a hexagon body and said post undercut includes a cylindrical body; and said keyed channel includes a hexagon channel.

4. The unmanned aerial vehicle as set forth in claim 1, wherein said first keyed post, said second keyed post, said third keyed post and said fourth keyed post including a post undercut;

said first actuator, said second actuator, said third actuator and said fourth actuator including a capture body;

said first, second, third and fourth capture body abutting said first, second, third and fourth post undercut respectively for defining a lower rotational post guide during rotation of said first keyed receiver, said second keyed receiver, said third keyed receiver and said fourth keyed receiver relative to said first keyed post, said second keyed post, said third keyed post and said fourth keyed post respectively.

5. The unmanned aerial vehicle as set forth in claim 1, further including a protrusion coupled to said first keyed post, said second keyed post, said third keyed post and said fourth keyed post;

said protrusion concentric to said first keyed post, said second keyed post, said third keyed post and said fourth keyed post;

a protrusion receiver coupled to said first keyed receiver, said second keyed receiver, said third keyed receiver and said fourth keyed receiver, said protrusion receiver concentric to said first keyed receiver, said second keyed receiver, said third keyed receiver and said fourth keyed receiver; and said protrusion of said first keyed post, said second keyed post, said third keyed post and said fourth keyed post engaging with said protrusion receiver of said first keyed receiver, said second keyed receiver, said third keyed receiver and said fourth keyed receiver respectively for defining an upper rotational post guide during rotation of said first keyed receiver, said second keyed receiver, said third keyed receiver and said fourth keyed receiver relative to said first keyed post, said second keyed post, said third keyed post and said fourth keyed post respectively.

6. The unmanned aerial vehicle as set forth in claim 1, wherein said first, second, third and fourth actuators include a primary actuator and a secondary actuator;

said primary actuator includes a primary capture body and said secondary actuator includes a secondary capture body;

said primary actuator and said secondary actuator slidably diverging relative to said first, second, third and fourth keyed receiver for converging said primary capture body and said secondary capture body into abutment with said first, second, third and fourth keyed post; and said primary actuator and said secondary actuator slidably converging relative to said first, second, third and fourth keyed receiver for diverging said primary capture body and said secondary capture body and distancing primary capture body and said secondary capture body from said first, second, third and fourth keyed post.

7. The unmanned aerial vehicle as set forth in claim 1, wherein said first, second, third and fourth keyed receiver including an upper keyed receiver plate and a lower keyed receiver plate;

a primary guide wall and a secondary guide wall positioned between said upper keyed receiver plate and said lower keyed receiver plate for defining an actuator channel; and said first, second, third and fourth actuator slidably displaced within said actuator channel in said first, second, third and fourth keyed receiver respectively.

8. The unmanned aerial vehicle as set forth in claim 7, wherein said upper keyed receiver plate includes a first upper tab and a second upper tab;

said lower keyed receiver plate includes a first lower tab and a second lower tab;

said first upper tab and said first lower tab define a first propeller channel for receiving a first single propeller blade; and said second upper tab and said second lower tab define a second propeller channel for receiving a second single propeller blade.

9. The unmanned aerial vehicle as set forth in claim 1, further including a bias element coupled to said first, second, third and fourth actuator for maintaining and compressing said first, second, third and fourth actuator against said first, second, third and fourth keyed post respectively.

10. The unmanned aerial vehicle as set forth in claim 1, wherein said first, second, third and fourth rotor lift assemblies include an notched mounting member; and a first, second, third and fourth electronic controller systems coupled in said notched mounting member of said first, second, third and fourth rotor lift assemblies respectively for exposing said first, second, third and fourth electronic controller systems and cooling said first, second, third and fourth electronic controller systems and providing improved aerodynamics.

11. A lock mechanism for removeably coupling a first object with a second object, comprising:

a keyed post coupled to the first object;

a keyed receiver coupled to the second object; and an actuator slidably coupled to said keyed receiver and abutting said keyed post for maintaining said keyed post engaged within said keyed receiver and said actuator depressed for distancing said actuator from said keyed post for releasing said keyed post from said keyed receiver.

12. The lock mechanism as set forth in claim 11, wherein said keyed post includes a keyed head coupled to a post base by a post undercut;

said keyed receiver including a keyed channel;

said actuator including a capture body;

said keyed head engaging said keyed channel for terminating a rotational displacement of said keyed receiver relative to said keyed post;

said capture body abutting said post undercut for preventing disengagement of said keyed receiver relative to said keyed post, and said capture body withdrawing from said post undercut for permitting disengagement of said keyed receiver from said keyed post.

13. The lock mechanism as set forth in claim 11, further including a protrusion coupled to said keyed post;

said protrusion concentric to said keyed post;

a protrusion receiver coupled to said keyed receiver;

said protrusion receiver concentric to said keyed receiver; and said protrusion of said keyed post engaging with said protrusion receiver of said keyed receiver for defining an upper rotational post guide during rotation of said keyed receiver relative to said keyed post.

\* \* \* \* \*